United States Patent
Yabusaki et al.

(10) Patent No.: US 11,777,876 B2
(45) Date of Patent: Oct. 3, 2023

(54) CONTROL APPARATUS AND NON-TRANSITORY COMPUTER READABLE MEDIUM

(71) Applicant: FUJIFILM BUSINESS INNOVATION CORP., Tokyo (JP)

(72) Inventors: Ryoto Yabusaki, Kanagawa (JP); Kiyoshi Yasukawa, Kanagawa (JP); Tsuyoshi Toda, Kanagawa (JP); Satoshi Maruyama, Kanagawa (JP); Takafumi Haruta, Kanagawa (JP); Yohei Makino, Kanagawa (JP); Ryo Matsumoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/736,280

(22) Filed: May 4, 2022

(65) Prior Publication Data

US 2022/0263777 A1 Aug. 18, 2022

Related U.S. Application Data

(62) Division of application No. 16/567,133, filed on Sep. 11, 2019, now Pat. No. 11,349,784.

(30) Foreign Application Priority Data

Sep. 25, 2018 (JP) .................................. 2018-178438
Sep. 25, 2018 (JP) .................................. 2018-178439

(51) Int. Cl.
*H04L 51/02* (2022.01)
*H04L 51/046* (2022.01)

(52) U.S. Cl.
CPC ............ *H04L 51/02* (2013.01); *H04L 51/046* (2013.01)

(58) Field of Classification Search
CPC ....... H04L 51/02; H04L 51/046; H04L 51/18; G06F 3/1238; G06F 3/1292
See application file for complete search history.

(56) References Cited

U.S. PATENT DOCUMENTS

| | | | |
|---|---|---|---|
| 2009/0100160 A1* | 4/2009 | Bowerman | G06F 15/173 709/223 |
| 2014/0244769 A1 | 8/2014 | Sakuta et al. | |

(Continued)

FOREIGN PATENT DOCUMENTS

| | | | |
|---|---|---|---|
| JP | 2014-164522 A | | 9/2014 |
| JP | 2020029077 A | * | 2/2020 |
| KR | 20170074837 A | * | 6/2017 |

OTHER PUBLICATIONS

Feb. 9, 2022 Notice of Allowance Issued In U.S. Appl. No. 16/567,133.

*Primary Examiner* — Austin J Moreau
(74) *Attorney, Agent, or Firm* — Oliff PLC

(57) ABSTRACT

A control apparatus includes an execution controller configured to, when information related to an instruction for causing an information processing apparatus to execute a specific process is posted by a user in a talk room in which each of plural participating users is capable of posting and viewing information, control one information processing apparatus among information processing apparatuses associated with other users, among the users participating in the talk room, than the user who posts the information, to execute the specific process.

5 Claims, 20 Drawing Sheets

(56) References Cited

U.S. PATENT DOCUMENTS

2015/0172505 A1* 6/2015 Park .................. H04N 1/00307
                                                    358/1.15
2018/0227251 A1   8/2018 Takishima et al.

* cited by examiner

FIG.5

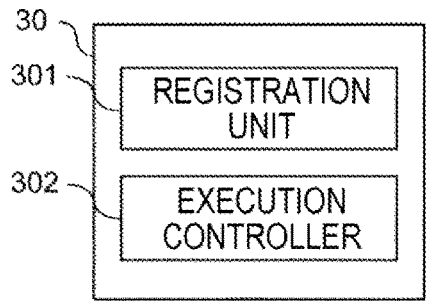

FIG.6

| USER | IMAGE FORMING APPARATUS | PRINT SETTINGS FOR INDIVIDUAL |
|---|---|---|
| A | IMAGE FORMING APPARATUS 40A | DUPLEX, COLOR, ... |
| B | IMAGE FORMING APPARATUS 40B | SINGLE-SIDED, MONOCHROME, ... |
| ⋮ | ⋮ | ⋮ |

FIG.7

| TALK ROOM | IMAGE FORMING APPARATUS | JOINED USER | PRINT SETTINGS FOR TALK ROOM |
|---|---|---|---|
| X | IMAGE FORMING APPARATUS 40A, IMAGE FORMING APPARATUS 40B | USER A | DUPLEX, COLOR, ... |
| | | USER B | SINGLE-SIDED, MONOCHROME, ... |
| | | USER C | DUPLEX, MONOCHROME, ... |
| | | USER D | SINGLE-SIDED, MONOCHROME, ... |
| Y | IMAGE FORMING APPARATUS 40A | USER A | DUPLEX, COLOR, ... |
| | | USER B | SINGLE-SIDED, MONOCHROME, ... |
| | | USER C | DUPLEX, COLOR, ... |
| | | USER D | SINGLE-SIDED, MONOCHROME, ... |
| ⋮ | ⋮ | ⋮ | ⋮ |

FIG.14

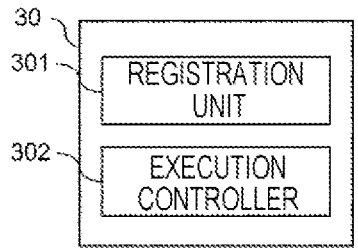

FIG.15

| USER | IMAGE FORMING APPARATUS | PRINT SETTINGS FOR INDIVIDUAL |
|---|---|---|
| A | IMAGE FORMING APPARATUS 40A | DUPLEX, COLOR, ... |
| B | IMAGE FORMING APPARATUS 40B | SINGLE-SIDED, COLOR, ... |
| ⋮ | ⋮ | ⋮ |

FIG.16

| TALK ROOM | IMAGE FORMING APPARATUS | JOINED USER | PRINT SETTINGS FOR TALK ROOM | USAGE AUTHORITY |
|---|---|---|---|---|
| X | IMAGE FORMING APPARATUS 40A | ○ USER A | DUPLEX, COLOR, ... | NO LIMIT |
| | | USER B | SINGLE-SIDED, MONOCHROME, ... | COLOR PRINTING UNAVAILABLE |
| | | USER C | DUPLEX, MONOCHROME, ... | COLOR PRINTING UNAVAILABLE |
| | | USER D | SINGLE-SIDED, MONOCHROME, ... | COLOR PRINTING UNAVAILABLE |
| Y | IMAGE FORMING APPARATUS 40B | USER A | DUPLEX, COLOR, ... | COLOR PRINTING AVAILABLE |
| | | ○ USER B | SINGLE-SIDED, MONOCHROME, ... | NO LIMIT |
| | | USER C | DUPLEX, COLOR, ... | COLOR PRINTING UNAVAILABLE |
| | | USER D | SINGLE-SIDED, MONOCHROME, ... | COLOR PRINTING UNAVAILABLE |
| ⋮ | ⋮ | ⋮ | ⋮ | ⋮ |

FIG.17

| USAGE AUTHORITY OF USER B IN TALK ROOM X ||
|---|---|
| COLOR PRINTING | AVAILABLE |
| MONOCHROME PRINTING | AVAILABLE |
| NUMBER OF COLOR PAGES | 10 |
| NUMBER OF MONOCHROME PAGES | 50 |
| SETTING CHANGE | UNAVAILABLE |

FIG.20

BEFORE CHANGE

| USAGE AUTHORITY OF USER B IN TALK ROOM X | |
|---|---|
| COLOR PRINTING | UNAVAILABLE |
| MONOCHROME PRINTING | UNAVAILABLE |
| NUMBER OF COLOR PAGES | 0 |
| NUMBER OF MONOCHROME PAGES | 0 |
| SETTING CHANGE | UNAVAILABLE |

AFTER CHANGE

| USAGE AUTHORITY OF USER B IN TALK ROOM X | |
|---|---|
| COLOR PRINTING | AVAILABLE |
| MONOCHROME PRINTING | AVAILABLE |
| NUMBER OF COLOR PAGES | 10 |
| NUMBER OF MONOCHROME PAGES | 50 |
| SETTING CHANGE | UNAVAILABLE |

CONTROL APPARATUS AND NON-TRANSITORY COMPUTER READABLE MEDIUM

CROSS-REFERENCE TO RELATED APPLICATIONS

This application is a Divisional of U.S. patent application Ser. No. 16/567,133 filed on Sep. 11, 2019, which is based on and claims priority under 35 USC 119 from Japanese Patent Application No. 2018-178438 and Japanese Patent Application No. 2018-178439, both filed Sep. 25, 2018.

BACKGROUND

(i) Technical Field

The present disclosure relates to a control apparatus and a non-transitory computer readable medium.

(ii) Related Art

JP-A 2014-164522 discloses a message notification device including: an operation instruction detecting unit that detects an operation instruction which operates an external device from messages in a communication service of displaying messages written by members along with time series, and specifies a member who writes a corresponding message as an instructor of the corresponding operation instruction; an external device controller that controls the external device according to the operation instruction detected by the operation instruction detecting unit; an operation result acquisition unit that acquires the result of the operation performed by the external device under the control of the external device controller; a report message generating unit that generates a report message which reports the result of the operation acquired by the operation result acquisition unit; and a report message display unit that outputs the report message generated by the report message generating unit to a server that provides the communication service, so that a corresponding message is displayed on the communication service in a state where the instructor specified by the operation instruction detecting unit is designated as a destination.

SUMMARY

A chatbot that is an automatic conversation program is recently known. The chatbot automatically posts a message in response to a user posting a message in a talk room. As a further utilization example, the chatbot executes a process required to execute an instruction included in the message posted by the user. For example, when the user posts a message on an instruction for causing an information processing apparatus to execute a specific process, the chatbot causes the information processing apparatus to execute the specific process. The user is allowed to register an information processing apparatus to be used by him/herself, in the chatbot in advance.

Assuming that plural users participate in one talk room together with the chatbot. In this case, each user may want to use an information processing apparatus which has not registered by him/herself, in the talk room. However, if each user is required to perform a registration operation every time, a registration operation of an apparatus becomes complicated.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a control apparatus including an execution controller configured to, when information related to an instruction for causing an information processing apparatus to execute a specific process is posted by a user in a talk room in which each of plural participating users is capable of posting and viewing information, control one information processing apparatus among information processing apparatuses associated with other users, among the users participating in the talk room, than the user who posts the information, to execute the specific process.

BRIEF DESCRIPTION OF THE DRAWINGS

Exemplary embodiment(s) of the present disclosure will be described in detail based on the following figures, wherein:

FIG. 5 is a block diagram illustrating an example of a functional configuration of the chatbot server;

FIG. 6 is an example of a table indicating a correspondence relationship between users and image forming apparatuses which are registered in a registration unit;

FIG. 7 is an example of a table indicating a correspondence relationship between talk rooms and image forming apparatuses which are registered in the registration unit;

FIG. 14 is a block diagram illustrating an example of a functional configuration of a chatbot server;

FIG. 15 is an example of a table indicating a correspondence relationship between users and image forming apparatuses which are registered in a registration unit;

FIG. 16 is an example of a table indicating a correspondence relationship between talk rooms and image forming apparatuses which are registered in the registration unit;

FIG. 17 is an example of a table indicating usage authorities for a user to use an image forming apparatus;

FIG. 20 is a view illustrating states before and after the usage authorities are changed;

DETAILED DESCRIPTION

Figure 1:
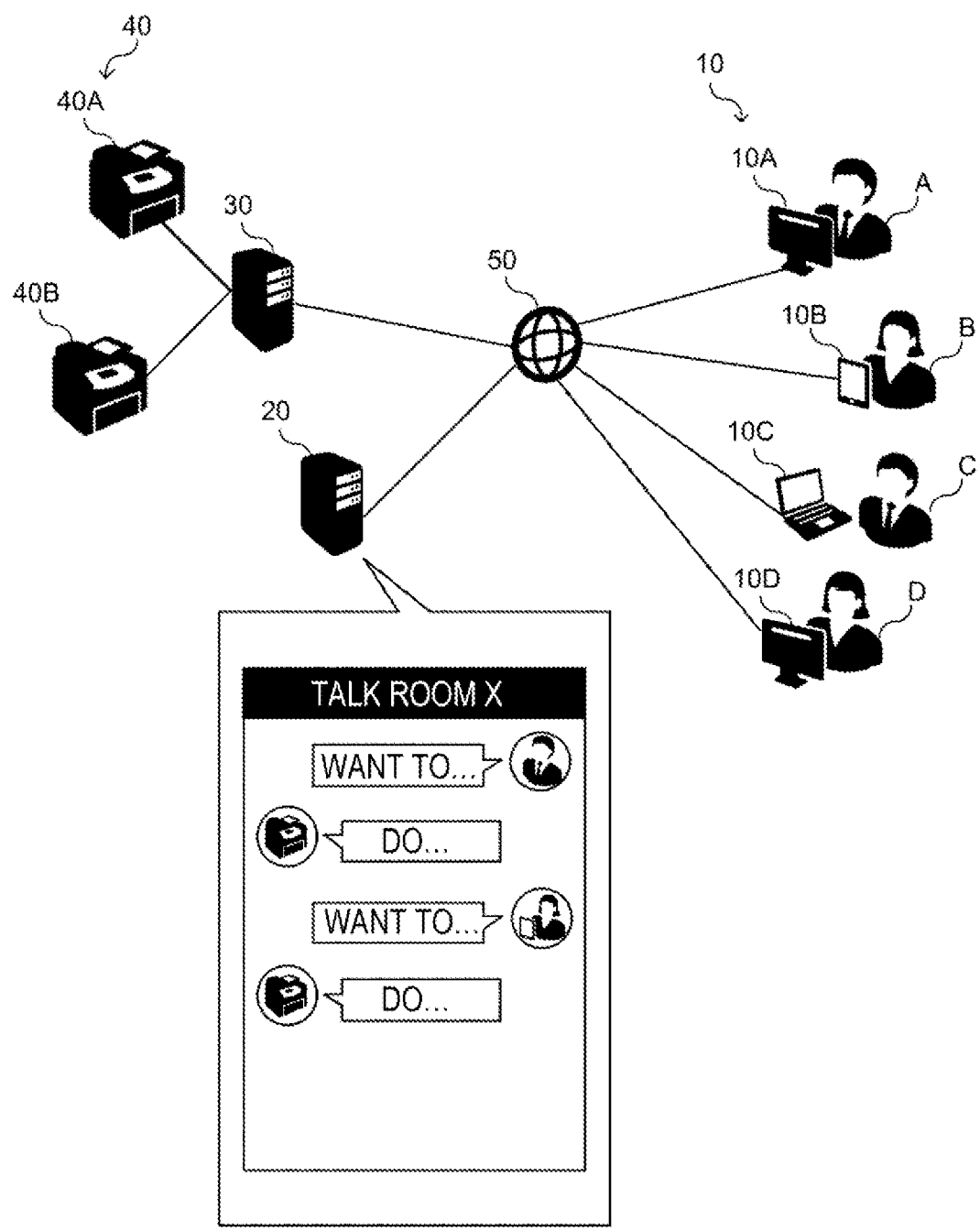
FIG. 1 is a view illustrating a schematic configuration of a control system according to a first exemplary embodiment.

Hereinafter, exemplary embodiments will be described with reference to the accompanying drawings. In the respective drawings, the same or equivalent constituent elements and portions are given the same reference numerals. Dimensional ratios in the drawings are exaggerated for the convenience of description and may differ from actual ratios.

First Exemplary Embodiment

FIG. 1 is a view illustrating a schematic configuration of a control system according to a first exemplary embodiment.

The control system includes user terminals 10, a talk room server 20, a chatbot server 30, and information processing apparatuses 40. The user terminals 10, the talk room server 20, and the chatbot server 30 (control apparatus) are connected to each other via the Internet 50.

The user terminals 10 are terminals used by users, and may be any terminals such as a desktop computer, a laptop PC, a tablet or a smart phone. In FIG. 1, it is assumed that a user A uses a user terminal 10A, a user B uses a user terminal 10B, a user C uses a user terminal 10C, and a user D uses a user terminal 10D. The user terminals 10A to 10D may be collectively referred to as the user terminal 10.

The talk room server 20 provides a talk room. The talk room is a virtual space where the users and a chatbot (which will be described later) join together and are capable of posting and sharing information such as messages, symbol strings, images, stickers and buttons, as a chat. Here, the chat means that plural members input information and exchange conversations in real time on a computer network. Here, the members include both users associated with real persons and a software robot operating according to specific rules. The chatbot is a software robot that performs a control so that a specific process is executed based on information posted by a user on the talk room.

A user is capable of posting information or uttering in the talk room, through the user terminal 10. In the talk room, the users are capable of sharing information, and furthermore, the chatbot is capable of replying in response to information posted by a user. The users are also capable of instructing the chatbot to cause the information processing apparatus 40 to execute a specific process, in the talk room. The chatbot extracts an instruction for the execution of the specific process by a natural language processing from, for example, information such as a posted message, and controls the information processing apparatus 40 to execute the specific process. A single user and a single chatbot may participate in the talk room or plural users and the chatbot may participate in the talk room. There may exist plural talk rooms according to the number of created rooms.

The chatbot server 30 is a server that manages the chatbot. As described above, the chatbot participates in the talk room, responds to a message of a user, and causes the information processing apparatus 40 to execute a specific process according to an instruction included in the message.

When information related to an instruction for causing the information processing apparatus 40 to execute a specific process is posted in the talk room in which the chatbot participates, the chatbot controls the information processing apparatus 40 registered in association with a user participating in the talk room to execute the specific process. The information processing apparatus 40 may be an apparatus that performs any information processing. Here, examples of the information processing include a process of executing printing from character data or image data, a process of generating or processing data by using equipment provided in the information processing apparatus 40, and a process of exchanging data between the information processing apparatus 40 and another apparatus. Hereinafter, an example will be described in which the information processing apparatus 40 is an image forming apparatus, and the instruction for causing the specific process to be executed is an instruction for causing printing to be executed. In the following description, the image forming apparatus will be denoted by a reference numeral 40. The instruction for causing the printing to be executed may include not only a direct instruction of causing the image forming apparatus 40 to execute the printing, but also providing information required to generate a print job, for example, image data to be printed or printing specifications, in the talk room.

The image forming apparatus 40 is an apparatus that forms an image on a recording medium, such as a sheet of paper, based on a print job. The image forming apparatus 40 may be any apparatus such as a printer or a multifunction machine. In the example of the control system in FIG. 1, an image forming apparatus 40A and an image forming apparatus 40B are managed by the chatbot server 30. The image forming apparatus 40A and the image forming apparatus 40B will be collectively referred to as the image forming apparatus 40. In the illustrated example, the image forming apparatus 40 is connected to the chatbot server 30, but the image forming apparatus 40 may be connected to the chatbot server 30 via the Internet 50.

Hereinafter, descriptions will be made on a hardware configuration of the talk room server 20 and the chatbot server 30.

Figure 2:
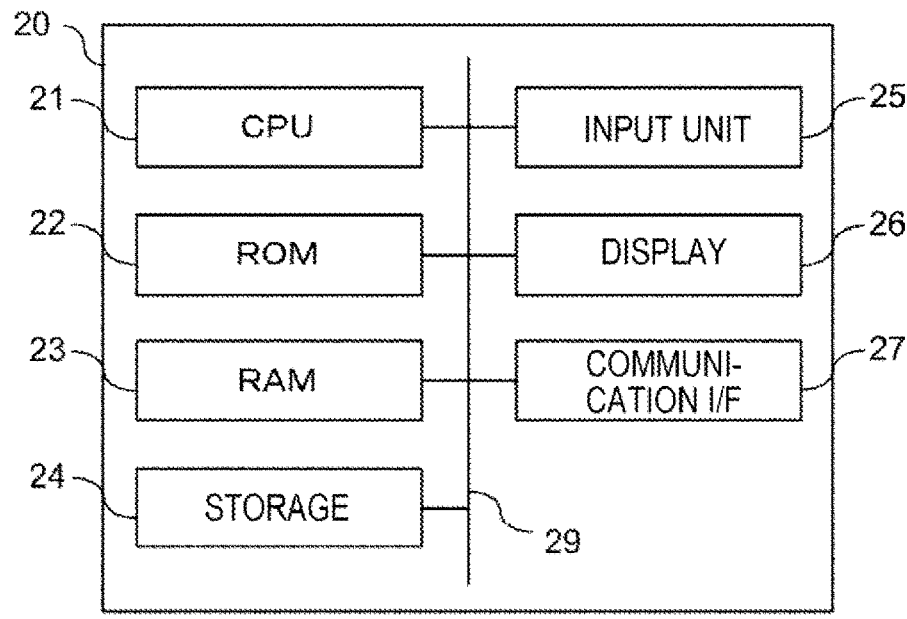
FIG. 2 is a block diagram illustrating a hardware configuration of a talk room server.

FIG. 2 is a block diagram illustrating a hardware configuration of the talk room server.

As illustrated in FIG. 2, the talk room server 20 has a central processing unit (CPU) 21, a read only memory (ROM) 22, a random access memory (RAM) 23, a storage 24, an input unit 25, a display 26, and a communication interface 27. The respective units are connected to each other via a bus 29 in a communicable manner.

The CPU 21 is a central arithmetic processing unit, and executes various programs and controls respective units. That is, the CPU 21 reads a program from the ROM 22 or the storage 24, and executes the program by using the RAM 23 as a work area. The CPU 21 controls the respective units and performs various arithmetic processes according to the program recorded in the ROM 22 or the storage 24. In the first exemplary embodiment, a talk room providing program that provides a talk room is stored in the ROM 22 or the storage 24.

The ROM 22 stores various programs and various data. The RAM 23 is the work area that temporarily stores a program or data. The storage 24 is implemented by a hard disk drive (HDD) or a solid state drive (SSD). The storage 24 stores various programs including an operating system and various data.

The input unit 25 includes a pointing device such as a mouse, and a keyboard, and is used to perform various inputs. The display 26 is, for example, a liquid crystal display, and displays various information. The display 26 may employ a touch panel type to serve as the input unit 25. The communication interface 27 is an interface that communicates with other apparatuses via the Internet 50. For example, standards such as Ethernet (registered trademark), FDDI, and Wi-Fi (registered trademark) are used in the communication interface 27.

Figure 3:
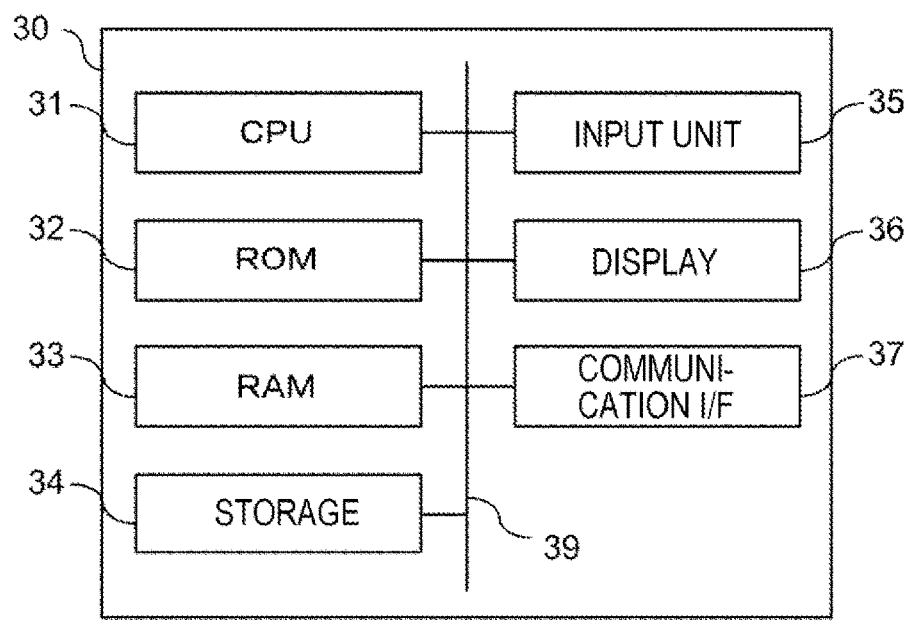
FIG. 3 is a block diagram illustrating a hardware configuration of a chatbot server.

FIG. 3 is a block diagram illustrating a hardware configuration of the chatbot server.

As illustrated in FIG. 3, the chatbot server 30 has a CPU 31, a ROM 32, a RAM 33, a storage 34, an input unit 35, a display 36, and a communication interface 37. The respective units are connected to each other via a bus 39 in a communicable manner. The respective units of the chatbot server 30 have the same functions as those of the talk room server 20 in FIG. 2.

Hereinafter, descriptions will be made on a functional configuration of the talk room server 20 and the chatbot server 30.

Figure 4:
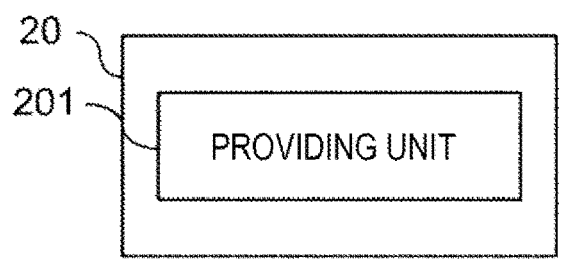
FIG. 4 is a block diagram illustrating an example of a functional configuration of the talk room server.

FIG. 4 is a block diagram illustrating an example of a functional configuration of the talk room server.

As illustrated in FIG. 4, the talk room server 20 has a providing unit 201 as a functional configuration. The functional configuration is implemented by the CPU 21 reading the talk room providing program stored in the ROM 22 or the storage 24 and loading and executing the talk room providing program on the RAM 23.

The providing unit 201 provides a talk room in which plural users are capable of participating and posting information such as messages. The talk room server 20 provides, for example, a talk room in which a single user and a single chatbot participate and a talk room in which plural users and a chatbot participate. Plural talk rooms may be created according to a creating request from a user. For example, when a certain user accesses the talk room server 20 to make a request for creation of a talk room and a specific talk room is created, the user who is a creator may invite other users to the created talk room, to cause the users to join the talk room. Alternatively, a user participating in the talk room may invite other users not participating in the talk room to the talk room, to cause the users to newly join the talk room.

FIG. 5 is a block diagram illustrating an example of a functional configuration of the chatbot server. FIG. 6 is an example of a table indicating a correspondence relationship between users and image forming apparatuses which are registered in a registration unit. FIG. 7 is an example of a table indicating a correspondence relationship between talk rooms and image forming apparatuses which are registered in the registration unit.

As illustrated in FIG. 5, the chatbot server 30 includes a registration unit 301 and an execution controller 302, as functional units. Each functional unit is implemented by the CPU 31 reading a control program stored in the ROM 32 or the storage 34 and loading and executing the control program on the RAM 33.

The registration unit 301 registers users and image forming apparatuses in association with each other, for example, as illustrated in FIG. 6. In the example illustrated in FIG. 6, further, basic print settings at the time of a printing instruction are also associated with each user. The registration unit 301 registers talk rooms and image forming apparatuses in association with each other, for example, as illustrated in FIG. 7. In the example illustrated in FIG. 7, further, users and basic print settings for the respective users are associated with each talk room.

The association relationship table illustrated in FIG. 6 is provided to register settings when a single user and a single chatbot participate in a talk room, that is, when an instruction is made for an image forming apparatus mainly used by the user. Meanwhile, the association relationship table illustrated in FIG. 7 is provided to register settings when plural users participate in a talk room, that is, when the talk room is shared. In the association relationship table illustrated in FIG. 7, users who are participating in each talk room are associated with each talk room, and print settings are associated with each user within the corresponding talk room. In response to a user joining a talk room, the image forming apparatus 40 associated with the user in the table illustrated in FIG. 6 is registered in association with the talk room, which forms the table illustrated in FIG. 7.

The execution controller 302 participates in a talk room as a chatbot. Then, when information related to an instruction for causing the image forming apparatus (the information processing apparatus) 40 to execute printing is posted by a user in a talk room, the execution controller 302 controls one image forming apparatus 40 among the image forming apparatuses 40 associated with users participating in the talk room to execute the printing. Even when the information is posted in the talk room by a user not associated with the image forming apparatus 40, the execution controller 302 controls one image forming apparatus 40 to execute the printing. It is noted that outside the talk room, the user who is associated with no image forming apparatus 40 cannot instruct any of the image forming apparatuses 40 associated with the users participating in the talk room, to execute printing.

Hereinafter, an operation of the chatbot server 30 will be described.

Figure 8:
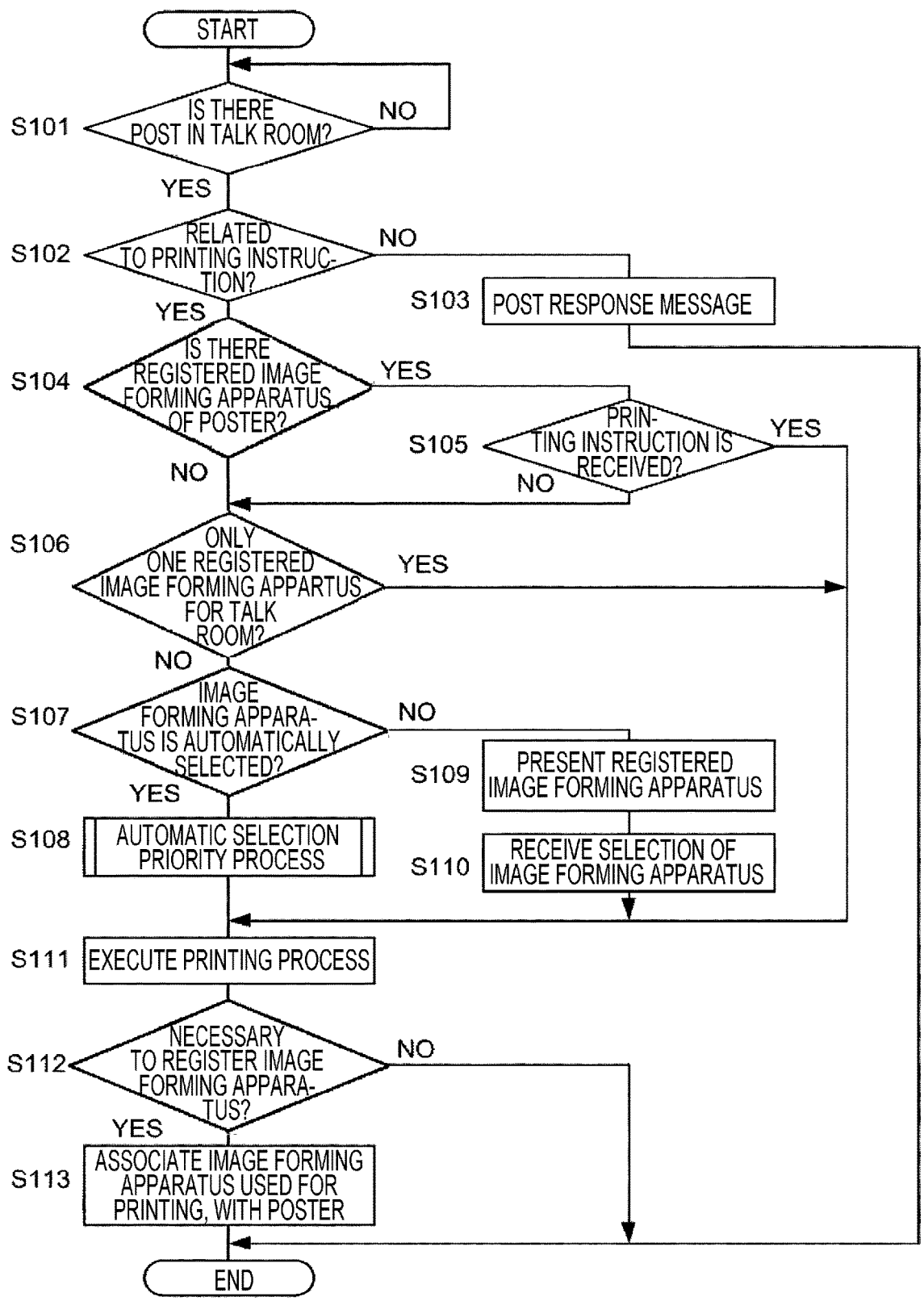
FIG. 8 is a flow chart of a control process by the chatbot server.
Figure 9:
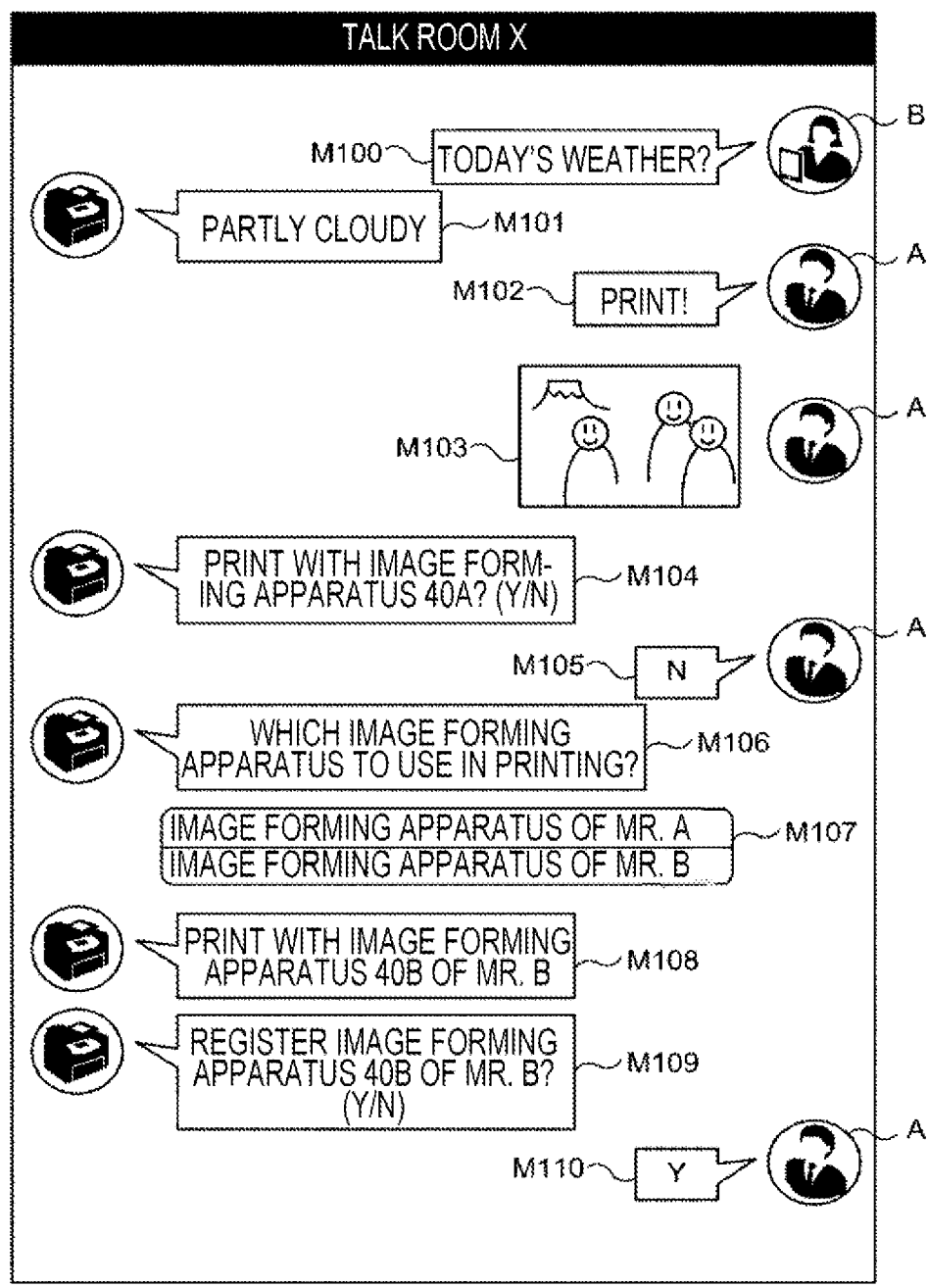
FIG. 9 is a view illustrating a state where posting is made in a talk room.

FIG. 8 is a flow chart illustrating a control process by the chatbot server. The control process is performed by the CPU 31 reading a control program from the ROM 32 or the storage 34, and loading and executing the control program on the RAM 33. FIG. 9 is a view illustrating a state where posting is made in a talk room.

The CPU 31, as the execution controller 302, determines whether information is posted by a user in the talk room (step S101). When there is no post in the talk room (step S101: NO), the CPU 31 waits until a post is made. When information is posted in the talk room (step S101: YES), the CPU 31 determines whether the posted information is information related to a printing instruction (step S102). Here, the CPU 31 performs a natural sentence analysis on the posted information, and when "print" or a term related to print settings is included in the information, the CPU 31 determines that the information is information related to a printing instruction.

When the posted information is not related to a printing instruction (step S102: NO), the CPU 31 posts response information corresponding to the posted information, in the talk room (step S103). For example, as illustrated in FIG. 9, when information M100 asking for weather is posted, the CPU 31, as the chatbot, acquires weather information from the Internet, and posts information M101 answering the weather in the talk room. Accordingly, a conversation between the user and the chatbot is established in the talk room.

When the posted information is related to a printing instruction (step S102: YES), the CPU 31 determines whether there is a registered image forming apparatus 40 of the poster (step S104). Here, the registered image forming apparatus 40 of the poster is an image forming apparatus 40 registered in association with a user him/herself in the table illustrated in FIG. 6. With reference to the table illustrated in FIG. 6, the CPU 31 determines whether there is an image forming apparatus registered in association with a user (who is the poster) him/herself. For example, as illustrated in FIG. 9, when information M102 and information M103 which are related to a printing instruction are posted in the talk room, the CPU 31 searches for the registered image forming apparatus 40.

When there is no registered image forming apparatus of the poster (step S104: NO), the CPU 31 proceeds to a process in step S106. When there is a registered image forming apparatus 40 of the poster (step S104: YES), the CPU 31 determines whether a printing instruction indicating that printing is to be executed by the registered image forming apparatus 40 is received (step S105). Here, for example, as illustrated in FIG. 9, the CPU 31 posts information M104 that prompts a user to select whether to execute printing using the registered image forming apparatus 40 of the poster, in the talk room. When the user posts the selection result as information M105, the CPU 31 receives the printing instruction.

When a printing instruction indicating that printing is to be executed by the registered image forming apparatus 40 is not received (step S105: NO), the CPU 31 proceeds to the process in step S106. When a printing instruction indicating that printing is to be executed by the registered image forming apparatus 40 is received (step S105: YES), the CPU 31 executes a printing process (step S111). The printing process is a process of causing the image forming apparatus 40 to execute printing based on the printing instruction posted by the poster. Here, the CPU 31 causes the image forming apparatus 40 to execute printing based on print settings for the talk room which are set for the user in the talk room, with reference to the table illustrated in FIG. 7.

The CPU 31 determines whether the talk room is associated with only one image forming apparatus 40 (step S106). Here, the CPU 31 determines the number of the image forming apparatuses 40 associated with the talk room, with reference to the table illustrated in FIG. 7.

When the talk room is associated with only one image forming apparatus 40 (step S106: YES), the CPU 31 proceeds to the process in step S111. In this case, there is no choice but to execute printing by the single image forming apparatus 40 associated with the talk room.

When there are two or more image forming apparatuses 40 associated with the talk room (step S106: NO), the CPU 31 determines whether to automatically select an image forming apparatus 40 (step S107). Here, the CPU 31 posts, for example, information that prompts a user to select whether to automatically select the image forming apparatus 40, in the talk room, and receives an instruction for automatic selection in accordance with user's selection. Alternatively, a setting that allows the CPU 31 to automatically select the image forming apparatus 40 may be made in advance in the talk room.

When the CPU 31 automatically selects the image forming apparatus 40 (step S107: YES), the CPU 31 executes a process of giving priority to the automatic selection and selects an image forming apparatus that the CPU 31 causes to execute printing (step S108). Hereinafter, this process will be referred to as an automatic selection priority process. Details of the automatic selection priority process will be described later with reference to FIG. 10. The CPU 31 causes the image forming apparatus 40 which is selected in the automatic selection priority process, to execute a printing process (step S111).

When the CPU 31 does not automatically select the image forming apparatus 40 (step S107: NO), the CPU 31 presents plural image forming apparatuses 40 registered in the talk room, as candidates that the CPU 31 causes to execute printing, in the talk room (step S109). Here, for example, as illustrated in FIG. 9, the CPU 31 posts information M106 asking which image forming apparatus to use in printing, in the talk room, and further posts information M107 indicating options. The information M107 also presents a user associated with the image forming apparatus. This is to indicate to whom the image forming apparatus 40 belongs. Alternatively, the information M107 may also present the location of the image forming apparatus 40.

Then, the CPU 31 receives selection of an image forming apparatus 40 from among the presented options of the image forming apparatus 40 (step S110). When the user selects any one of the image forming apparatuses through the information M107 in FIG. 9, the CPU 31 causes the selected image forming apparatus 40 to execute printing (step S111). Here, for example, as in information M108 in FIG. 9, the CPU 31 explicitly indicates the image forming apparatus 40 to be used for printing, together with a user name registered in association with the image forming apparatus 40. Accordingly, it becomes clear which image forming apparatus 40 associated with which user to use.

The CPU 31 determines whether it is necessary to register the image forming apparatus 40 that executes printing, in association with a user him/herself (step S112). Here, for example, as in information M109 in FIG. 9, the CPU 31 posts information that asks whether to register the image forming apparatus 40, in the talk room.

When it is unnecessary to register the image forming apparatus 40 (step S112: NO), the CPU 31 ends the control process illustrated in FIG. 8.

When it is necessary to register the image forming apparatus 40 (step S112: YES), the CPU 31, as the registration unit 301, associates the image forming apparatus 40 that the CPU 31 causes to execute printing, with the poster (step S113). Here, for example, as illustrated in FIG. 9, when information M110 affirming registration of the image forming apparatus 40 is posted, the CPU 31 registers the image forming apparatus 40 in association with a user A him/herself who issues an instruction for printing.

Hereinafter, detailed descriptions will be made on the automatic selection priority process in step S107 in FIG. 8.

Figure 10:
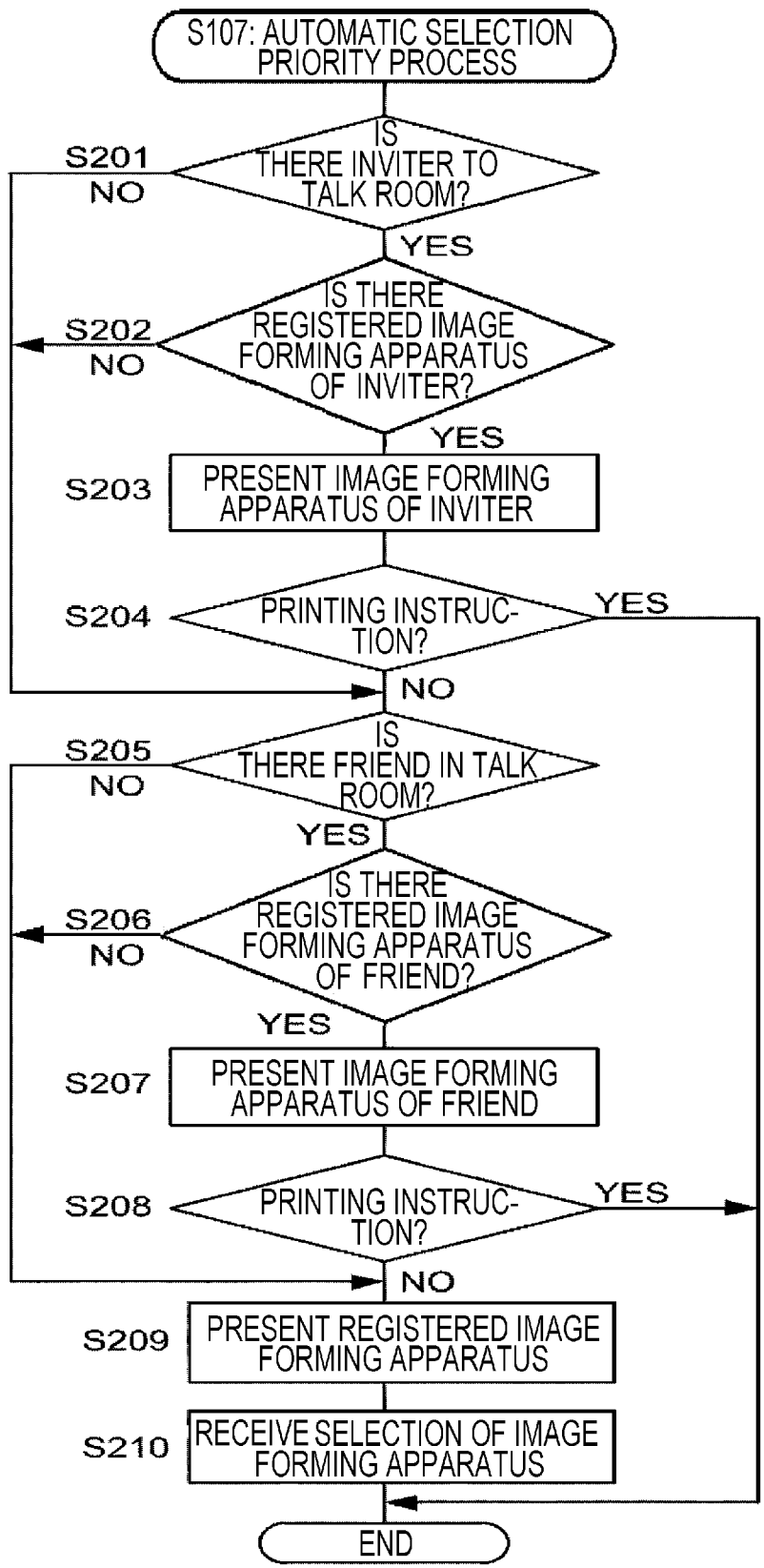
FIG. 10 is a flow chart of an automatic selection priority process.
Figure 11:
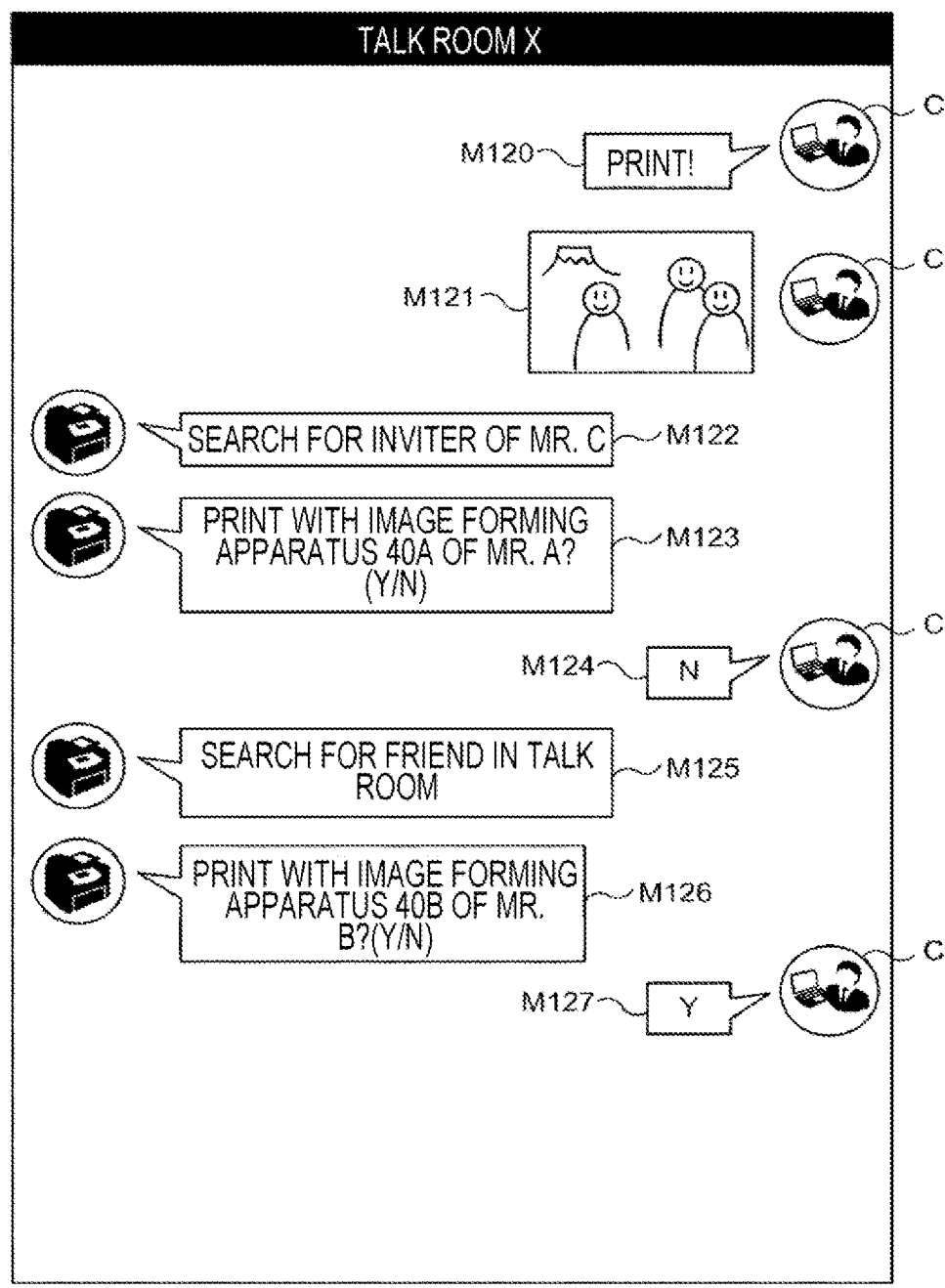
FIG. 11 is a view illustrating another example illustrating a state where posting is made in a talk room.

FIG. 10 is a flow chart illustrating the automatic selection priority process. FIG. 11 is a view illustrating another example indicating a state where posting is made in the talk room.

The CPU 31 determines whether there is an inviter who invites the user who posts the information in step S101 in FIG. 8, to the talk room (step S201). For example, as illustrated in FIG. 11, it is assumed that a user C posts information M120 and information M121 which are related to a printing instruction, in the talk room. Here, the CPU 31 posts information M122 indicating that an inviter will be searched for, and searches for the inviter.

When there is no inviter (step S201: NO), the CPU 31 proceeds to a process in step S205. When there is an inviter (step S201: YES), the CPU 31 determines whether there is the image forming apparatus 40 registered in association with the inviter (step S202). Here, the CPU 31 determines whether there is the image forming apparatus 40 registered in association with the inviter him/herself, with reference to the table in FIG. 6.

When there is no image forming apparatus 40 registered in association with the inviter (step S202: NO), the CPU 31 proceeds to the process in step S205.

When there is the image forming apparatus 40 registered in association with the inviter (step S202: YES), the CPU 31 presents the image forming apparatus 40 of the inviter (step S203). Further, the CPU 31 determines whether an instruction indicating that printing is to be executed by the presented image forming apparatus 40 is made by the user (step S204). Here, as illustrated in FIG. 11, the CPU 31 posts information M123 that prompts a user to select whether to execute printing by the image forming apparatus 40 of the inviter. When the user posts information M124 that affirms or denies the information M123, the intention of printing is confirmed.

When printing is instructed (step S204: YES), the CPU 31 ends the automatic selection priority process, and returns to the control process in FIG. 8.

When printing is not instructed (step S204: NO), the CPU 31 determines whether there is a friend of the user who posts the information in step S101 in FIG. 8, in the talk room (step S205). Here, the CPU 31 uses a social networking service (SNS) provided by an external server via, for example, the Internet 50, to investigate interaction information indicating interaction among users in the SNS. When there is a user having an interaction relationship with the user, who posts the information in step S101, in the SNS, in the talk room, the CPU 31 determines that there is a friend. When a function of registering an interaction relationship is provided in the talk room server 20, the CPU 31 may refer to the interaction information of the talk room server 20 without using the SNS on the external server. Here, for example, as illustrated in FIG. 11, the CPU 31 posts information M125 indicating that a user having a friend relationship in the talk room will be searched for.

When there is no user having a friend relationship in the talk room (step S205: NO), the CPU 31 proceeds to a process in step S209. When there is a user having a friend relationship in the talk room (step S205: YES), the CPU 31 determines whether there is an image forming apparatus 40 registered in association with the friend (step S206). Here, with reference to the table in FIG. 6, the CPU 31 determines whether there is the image forming apparatus 40 registered in association with a user him/here who is the friend.

When there is no image forming apparatus 40 registered in association with the friend (step S206: NO), the CPU 31 proceeds to the process in step S209. When there is the image forming apparatus 40 registered in association with the friend (step S206: YES), the CPU 31 presents the image forming apparatus 40 of the friend in the talk room (step S207). Further, the CPU 31 determines whether an instruction indicating that printing is to be executed by the presented image forming apparatus 40 is made by the user (step S208). Here, as illustrated in FIG. 11, the CPU 31 posts information M126 that prompts a user to select whether to execute printing by the image forming apparatus 40 of the friend. When the user posts information M127 that affirms or denies the information M126, the intention of printing is confirmed.

When printing is instructed (step S208: YES), the CPU 31 ends the automatic selection priority process, and returns to the control process in FIG. 8.

When printing is not instructed (step S208: NO), the CPU 31 presents the image forming apparatus 40 registered in association with the talk room, in the talk room (step S209). Here, the CPU 31 posts the information M107 of FIG. 9. Then, the CPU 31 receives that any of the image forming apparatuses 40 is selected in the talk room (step S210). When receiving the selection of the image forming apparatus 40, the CPU 31 ends the automatic selection priority process, and returns to the control process in FIG. 8. In this manner, when the user does not instruct the automatically selected image forming apparatus 40 to execute printing, the CPU 31 presents options of the image forming apparatus 40, and prompts the user to select the image forming apparatus 40.

The descriptions have been made on the control system according to the first exemplary embodiment. It should be noted that the present disclosure is not limited to the first exemplary embodiment. Various modifications or improvements may be made. Hereinafter, modified or improved examples will be described.

Figure 12:
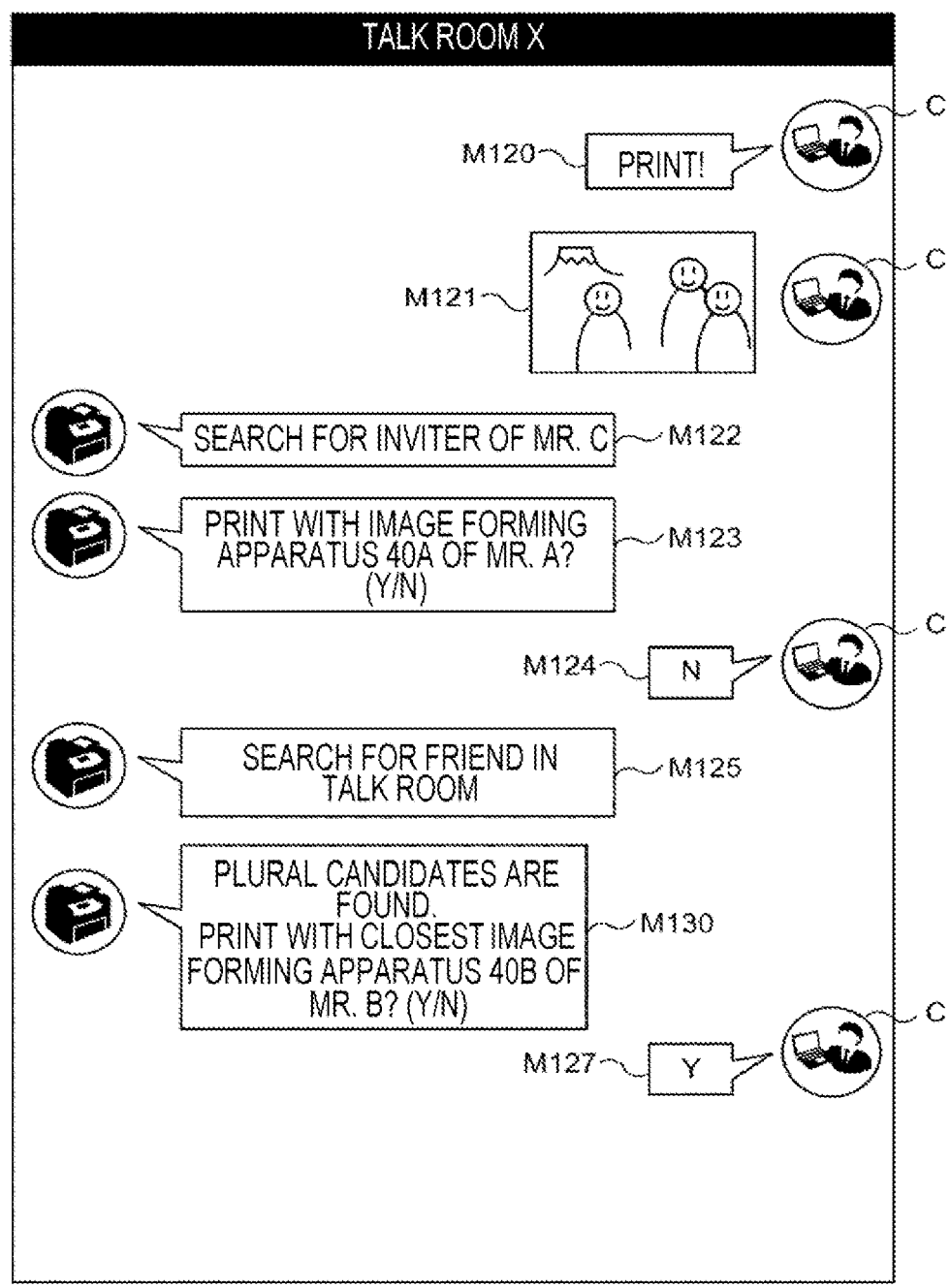
FIG. 12 is a view illustrating a further another example illustrating a state where posting is made in a talk room.

FIG. 12 is a view illustrating a further another example indicating a state where posting is made in a talk room.

In the example of postings in the talk room illustrated in FIG. 11, as a result of the search of the friend in the talk room, the CPU 31 asks the user to confirm whether to execute printing by the image forming apparatus 40B of Mr. B through the information M126. However, when there are plural friends found through the search and there are also plural image forming apparatuses 40 registered in association with each friend, the CPU 31 may select a proper image forming apparatus 40 from the plural image forming apparatuses 40 and present the selected image forming apparatus 40 to the user.

For example, as indicated in information M130 in FIG. 12, the CPU 31 presents the image forming apparatus 40 closest to the user among the image forming apparatuses 40. Here, in order to present the image forming apparatus 40 closest to the user, the CPU 31 needs location information indicating the location of the user and location information indicating the locations of the image forming apparatuses 40. The location information may be registered in advance in the chatbot server 30, for example, as an attribute of the user and attributes of the image forming apparatuses 40. Alternatively, since the locations of the image forming apparatuses 40 are usually fixed, only the locations of the image forming apparatuses 40 may be registered in advance and the location information of the user may be acquired from the user terminal 10 each time a printing instruction is made. In this case, the user terminal 10 checks its own location by, for example, a GPS antenna, and transmits the location to the chatbot server 30. Alternatively, locations of the user and the image forming apparatuses 40 may be estimated based on attribute data indicating affiliations of the user and the image forming apparatus 40. For example, when the user A has an attribute indicating that he/she belongs to a certain company or a department of a company, a place of the company or the department of the company may be estimated as the location of the user.

Figure 13:
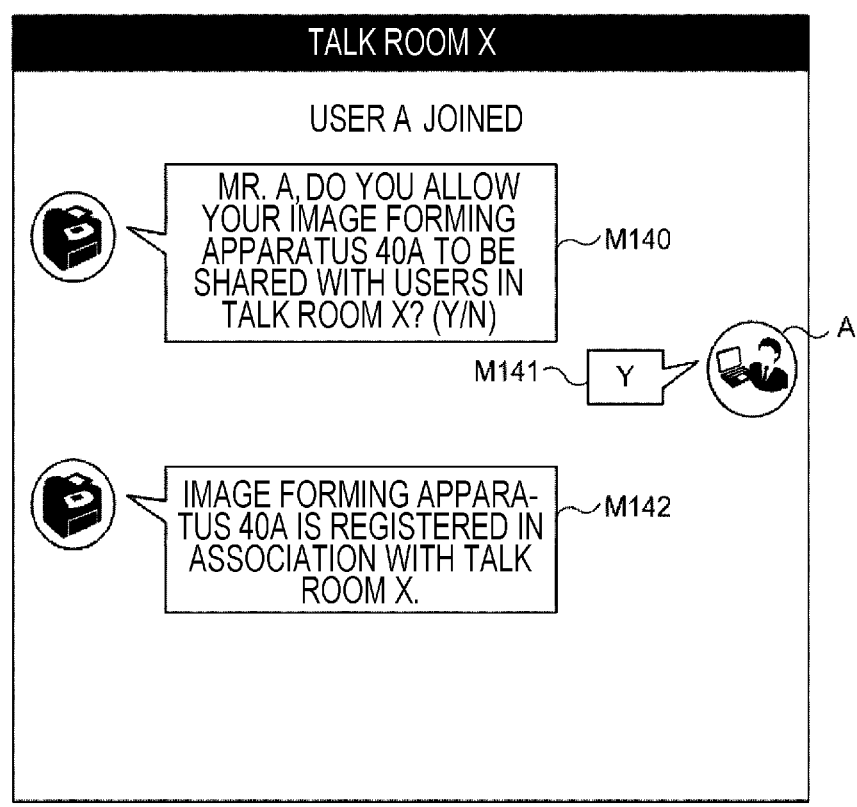
FIG. 13 is a view illustrating a state of a talk room when a user joins the talk room.

FIG. 13 is a view illustrating a state of a talk room when a user joins the talk room.

In the first exemplary embodiment, the descriptions have been made on the case where the image forming apparatus 40 associated with a user joining in the talk room is automatically shared by the users in the talk room.

However, the user may be allowed to determine whether the image forming apparatus 40 is to be shared.

In this case, when a user joins the talk room, the CPU 31 of the chatbot server 30, as a chatbot, confirms whether to share the image forming apparatus 40 associated with the user him/herself, with other users in the talk room. As illustrated in FIG. 13, the CPU 31 posts information M140 in the talk room.

In response to the information M140, the user selects whether the image forming apparatus 40 associated with the user him/herself is to be shared by the other users, by posting information M141 indicating affirmation or denial.

Only when the user affirms the sharing of the image forming apparatus 40, the CPU 31 registers the image forming apparatus 40 associated with the user him/herself, in the table illustrated in FIG. 7 in association with the talk room. The CPU 31 posts information M142 indicating that the image forming apparatus 40 is registered in association with the talk room, in the talk room.

Second Exemplary Embodiment

FIG. 14 is a block diagram illustrating an example of a functional configuration of a chatbot server. FIG. 15 is an example of a table indicating a correspondence relationship between users and image forming apparatuses which are registered in a registration unit. FIG. 16 is an example of a table indicating a correspondence relationship between talk rooms and image forming apparatuses which are registered in the registration unit. FIG. 17 is an example of a table indicating usage authorities for a user to use an image forming apparatus.

As illustrated in FIG. 14, the chatbot server 30 includes a registration unit 301 and an execution controller 302, as a functional configuration. Each functional unit is implemented by the CPU 31 reading a control program stored in the ROM 32 or the storage 34 and loading and executing the control program on the RAM 33.

Before information related to an instruction for causing the image forming apparatus 40 to execute a printing process is posted by a user in a talk room, the registration unit 301 registers the image forming apparatus 40 which executes a specific process according to information, in association with the talk room in advance. For example, as illustrated in FIG. 15, the registration unit 301 registers users and image forming apparatuses in association with each other. In the example illustrated in FIG. 15, further, basic print settings at the time of a printing instruction are also associated with each user. The registration unit 301 registers talk rooms and image forming apparatuses in association with each other, for example, as illustrated in FIG. 16. In the example illustrated in FIG. 16, further, users and basic print settings for the respective users are associated with each talk room.

The association relationship table illustrated in FIG. 15 is provided to register settings when a single user and a single chatbot participate in a talk room, that is, when an instruction is made for an image forming apparatus 40 mainly used by the user. Meanwhile, the association relationship table illustrated in FIG. 16 is provided to register settings when plural users participate in a talk room, that is, when the talk room is shared. In the association relationship table illustrated in FIG. 16, users who are participating in each talk room are associated with each talk room, and print settings are associated with each user within the corresponding talk room. In response to a user joining a talk room, the image forming apparatus 40 associated with the user in the table illustrated in FIG. 15 is registered in association with the talk room, which forms the table illustrated in FIG. 16.

The registration unit 301 further registers at least one of plural users, as an administrator. In the table illustrated in FIG. 16, a user registered as an administrator is marked with "○" in a user name column. The user registered as the administrator is given authority to set usage authority of the image forming apparatus 40 registered in a talk room, to any user among the plural users. The set usage authority is registered for each user and for each talk room, for example, as in the table illustrated in FIG. 16. When only the usage authorities illustrated in FIG. 16 are extracted, the table as illustrated in FIG. 17 is obtained. Since information included in FIG. 17 may also be included in FIG. 16, it is not necessary to prepare the two tables illustrated in FIGS. 16 and 17.

The tables illustrated in FIGS. 15 to 17 are stored in, for example, the storage 34.

The execution controller 302 participates in a talk room as a chatbot. Then, when information related to an instruction for causing the image forming apparatus (information processing apparatus) 40 to execute printing is posted by a user in a talk room, the execution controller 302 controls the image forming apparatus 40 registered in association with the talk room to execute the printing. For example, it is assumed that an image forming apparatus 40B different from an image forming apparatus 40A associated with the talk room is associated with a user B him/herself participating in the talk room. Even in such a case, information posted in the talk room is processed by the image forming apparatus 40A associated with the talk room. It should be noted that when the user B associated with the other image forming apparatus 40B posts information related to an instruction for causing a specific process to be executed in another talk room which is other than the above talk room and which is dedicated to the user B, printing is executed by the other information processing apparatus 40B. Here, a "talk room dedicated to a user" is a talk room in which the single user and a single chatbot participate.

Hereinafter, an operation of the chatbot server 30 will be described.

Figure 18:
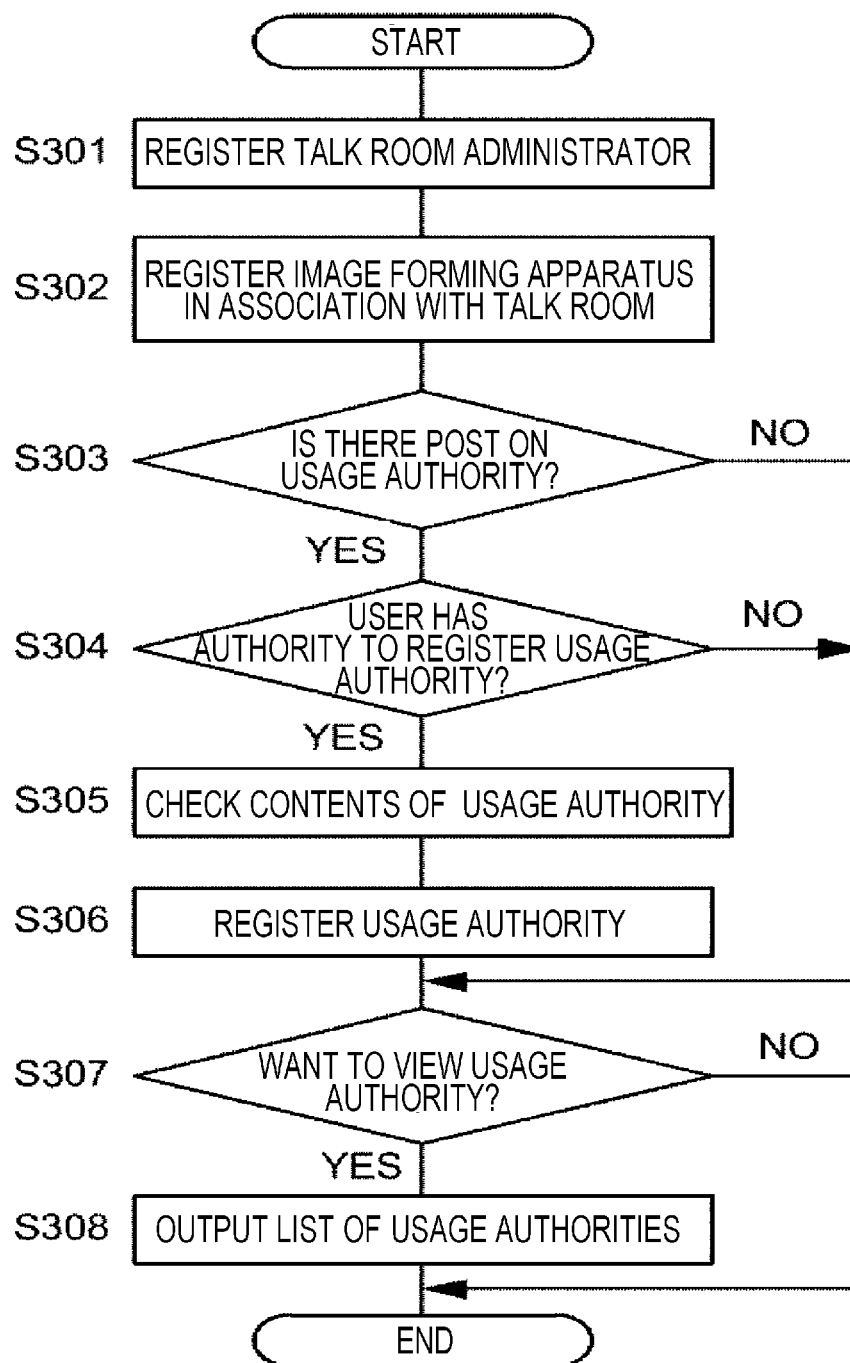
FIG. 18 is a flow chart of a registration process by the chatbot server.
Figure 19:
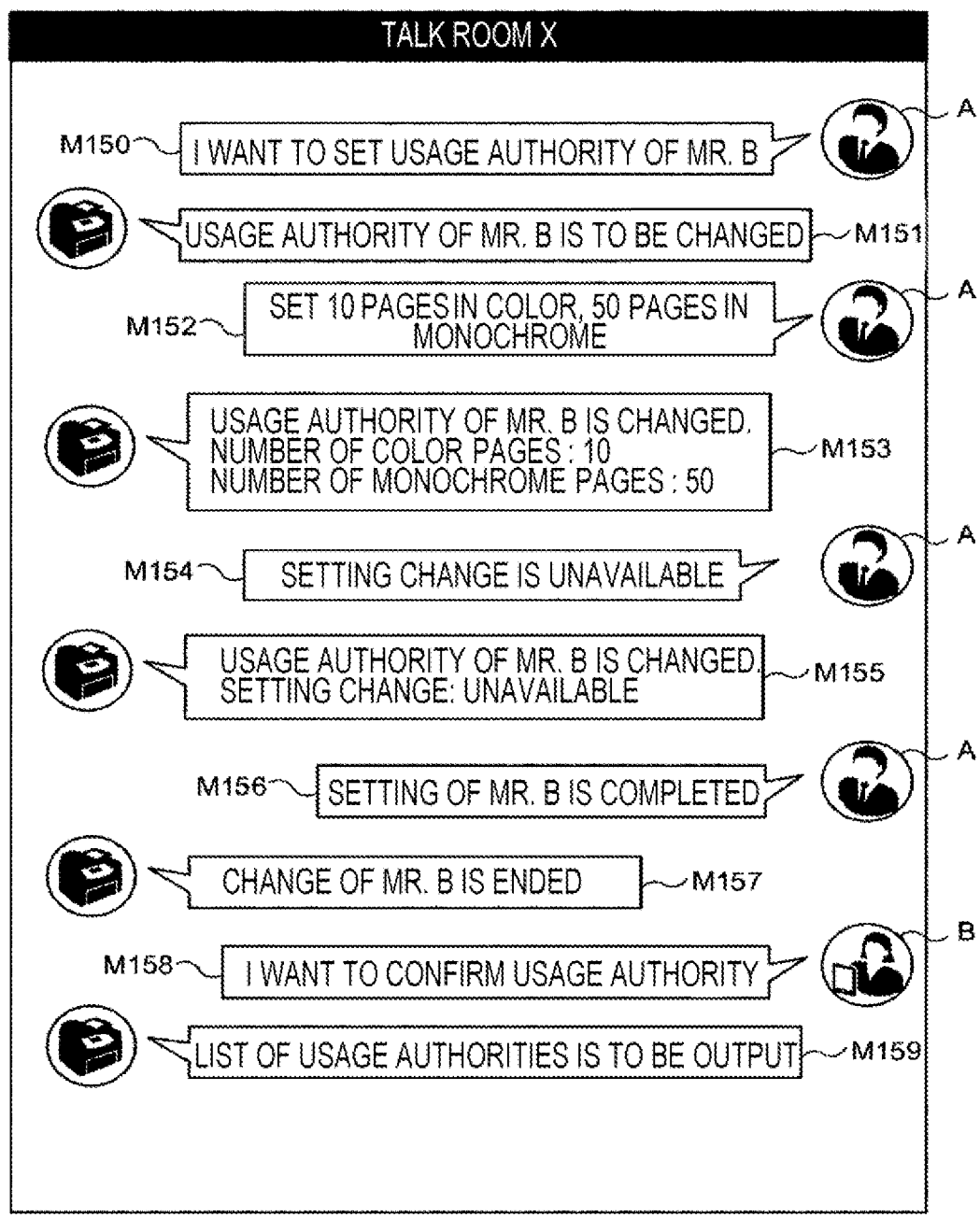
FIG. 19 is a view illustrating a state where posting is made in a talk room.

FIG. 18 is a flow chart illustrating a registration process by the chatbot server. The registration process illustrated in FIG. 18 is a flow of a process executed by the chatbot server 30 as a registration unit, in a control process by the chatbot server 30. The control process is performed by the CPU 31 reading a control program from the ROM 32 or the storage 34, and loading and executing the control program on the RAM 33. FIG. 19 is a view illustrating a state where posting is made in a talk room. FIG. 20 is a view illustrating states before and after usage authorities are changed.

The CPU 31 registers an administrator in a talk room that may be shared by plural participating users (step S301). The administrator is registered, for example, at a timing when a new talk room is created for plural users, or at a timing when an instruction is made by a user after the talk room is created. The administrator may be freely selected from the plural users participating in the talk room, or may be a user who creates the talk room.

Then, the CPU 31 registers an image forming apparatus 40 in association with the talk room (step S302). The image forming apparatus 40 registered in association with the talk room is, for example, an image forming apparatus 40 associated with the user him/herself who is registered as the administrator in step S301. In this case, the CPU 31 refers to the table illustrated in FIG. 15. Alternatively, among the image forming apparatuses 40 associated with the users themselves who participate in the talk room, any image forming apparatus 40 may be registered in association with the talk room.

The CPU 31 determines whether information related to a usage authority of a user is posted in the talk room (step S303). For example, as illustrated in FIG. 19, when information M150 indicating that a usage authority of a specific user is to be set is posted in the talk room, the CPU 31 determines that the information related to the usage authority is posted.

When information related to a usage authority is not posted (step S303: NO), the CPU 31 proceeds to a process in step S307.

When the information related to the usage authority is posted (step S303: YES), the CPU 31 determines whether the user who posts the information has an authority to register a usage authority (step S304). Here, the CPU 31 refers to the table in FIG. 17 to determine whether the user is a user capable of changing settings.

When the user who posts the information does not have the authority to register a usage authority (step S304: NO), the usage authority is not registered, and the CPU 31 proceeds to the process in step S307.

When the user who posts the information has the authority to register a usage authority (step S304: YES), the CPU 31 subsequently checks contents of the usage authority to be registered based on the information posted by the user (step S305). For example, as illustrated in FIG. 19, the CPU 31 posts information M151 indicating that the usage authority of the specific user is to be changed, and waits for posting of information by the user.

Then, the CPU 31 sets or changes the usage authority based on specific settings of the usage authority included in the posted information (step S306). For example, as illustrated in FIG. 19, when information M152 and information M154 indicating specific setting contents of the usage authorities are posted by the user, the CPU 31 sets or changes the usage authorities according to the posted contents. Here, the CPU 31 posts information M153 and information M155 to allow the user to check the setting contents of the usage authorities. When information M156 indicating that the setting of the usage authority is completed is posted by the user, the CPU 31 posts information M157 indicating that the setting of the usage authority ends, and completes the registration of the usage authority. It is assumed that the table illustrated in the left part of FIG. 20 is default usage authorities of the user B. In this case, the usage authorities are set or changed to those as illustrated in the right part of FIG. 20 based on the examples of the information M153 and information M155 in FIG. 19.

The CPU 31 determines whether the user wants to view the usage authorities (step S307). For example, when information M158 indicating that the user wants to check the usage authority is posted as illustrated in FIG. 19, the CPU 31 confirms that the user wants to view the usage authority.

When the user does not want to view the usage authority (step S307: NO), the CPU 31 ends the registration process. When the user wants to view the usage authority (step S307: YES), the CPU 31 outputs a list of the usage authorities of each user (step S308), and ends the registration process. For example, as illustrated in FIG. 19, when the information M158 indicating that viewing of the usage authority is requested is posted by the user, the CPU 31 posts information M159 indicating that the list of the usage authorities is to be output, and outputs the list of the usage authorities.

The list of the usage authorities to be output is output to the talk room or on a sheet of paper, as, for example, the table illustrated in FIG. 16. Alternatively, as illustrated in FIG. 17, the usage authorities for each user may be output. In the case of outputting onto the sheet of paper, an image of the table illustrated in FIG. 16 is printed on the sheet by the image forming apparatus 40 registered in association with the talk room.

After the registration process ends, the process from step S301 or step S303 may be repeated again.

Figure 21:
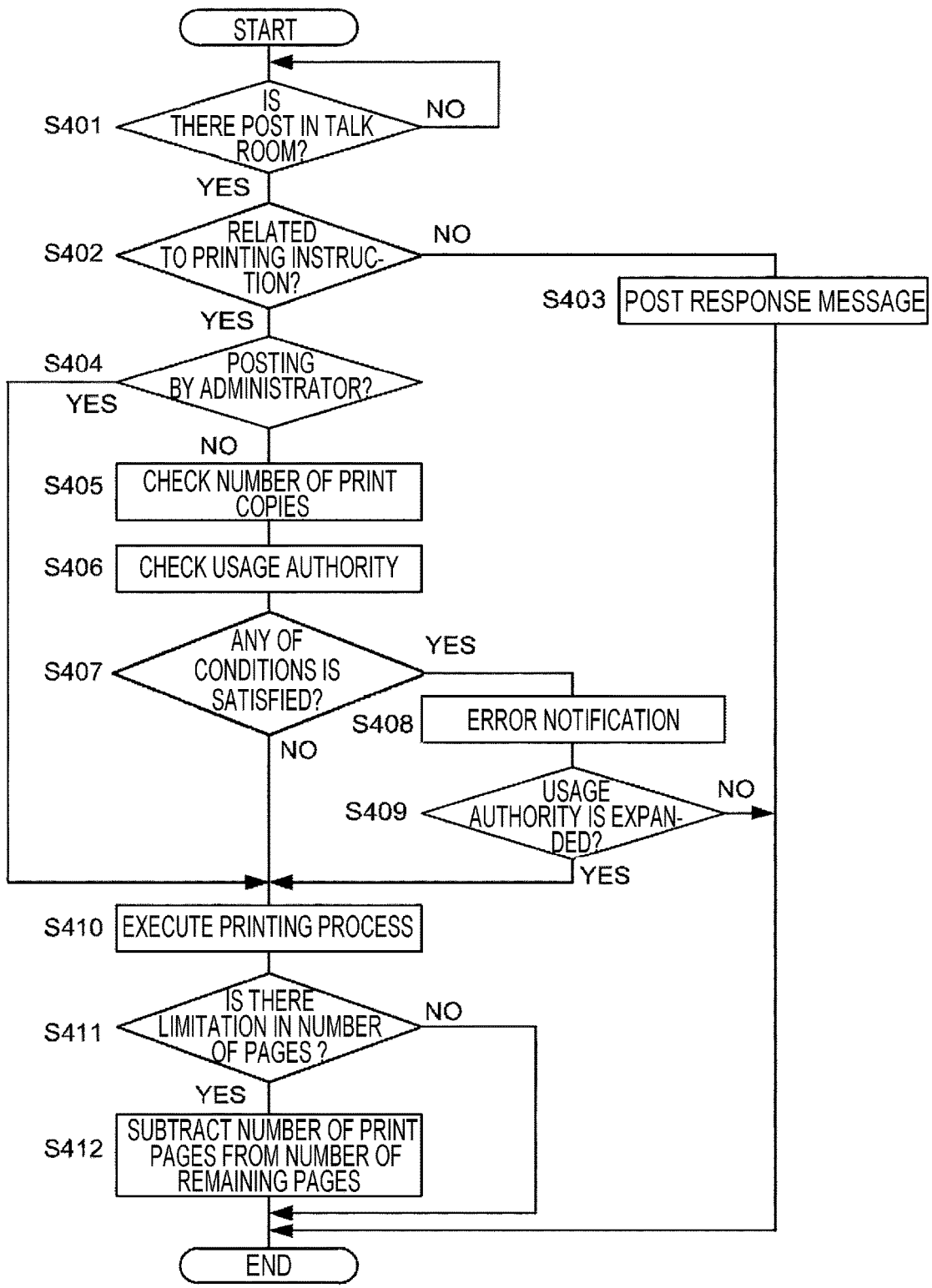
FIG. 21 is a flow chart of an execution process of causing an information processing apparatus to execute a specific process.
Figure 22:
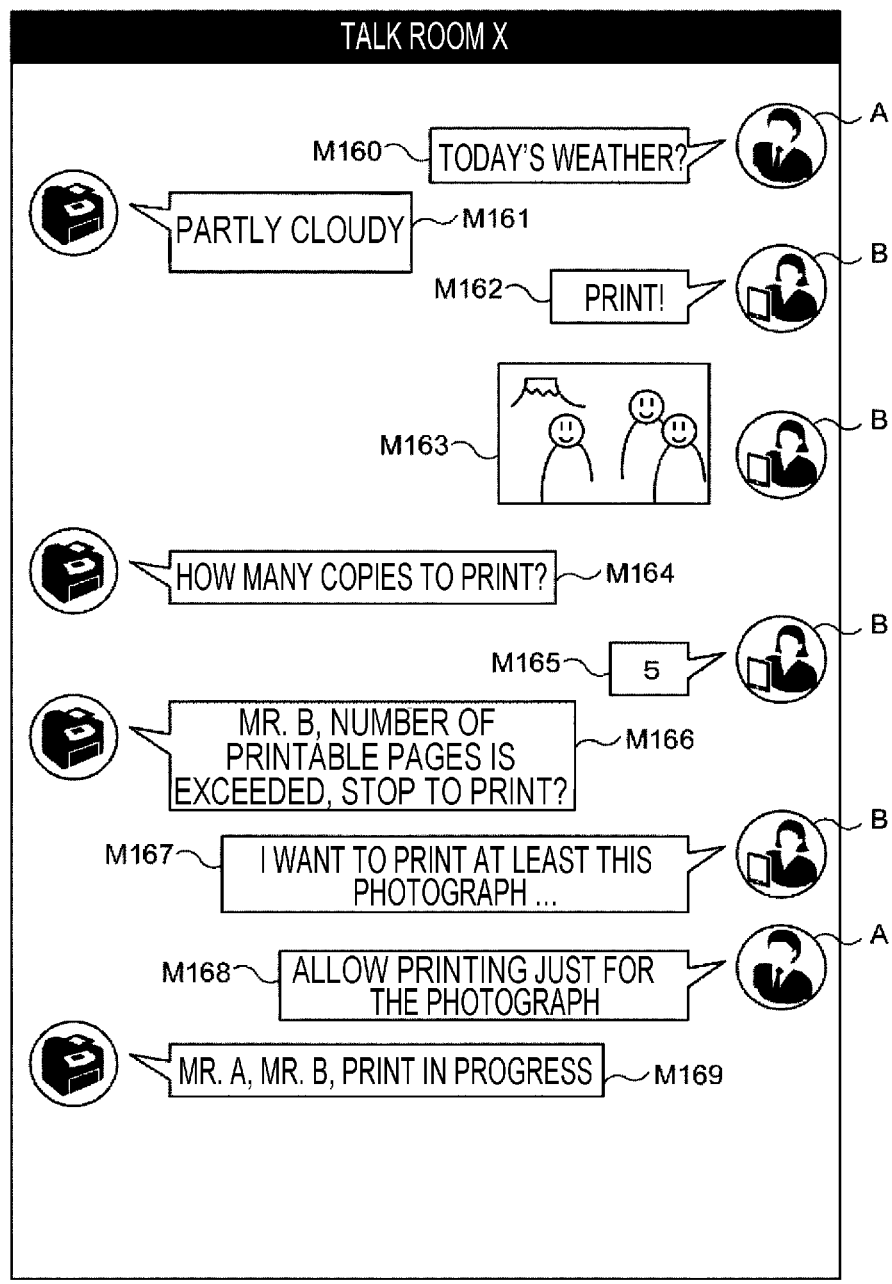
FIG. 22 is a view illustrating a state where posting is made in a talk room.

FIG. 21 is a flow chart of an execution process of causing an information processing apparatus to execute a specific process. The execution process is a flow of a process executed by the chatbot server 30 as an execution controller, in the control process by the chatbot server 30. The control process is performed by the CPU 31 reading a control program from the ROM 32 or the storage 34, and loading and executing the control program on the RAM 33. FIG. 22 is a view illustrating a state where posting is made in a talk room.

The CPU 31 determines whether information is posted by a user in a talk room (step S401). When there is no post in the talk room (step S401: NO), the CPU 31 waits until a post is made. When information is posted in the talk room (step S401: YES), the CPU 31 determines whether the posted information is information related to a printing instruction (step S402). Here, the CPU 31 performs a natural sentence analysis on the posted information, and when "print" or a term related to print settings is included in the information, the CPU 31 determines that the information is information related to a printing instruction.

When the posted information is not related to a printing instruction (step S402: NO), the CPU 31 posts information such as a response message corresponding to the posted information, in the talk room (step S403). For example, as illustrated in FIG. 22, when information M160 asking for weather is posted, the CPU 31, as a chatbot, acquires weather information from the Internet, and posts information M161 answering the weather in the talk room. Accordingly, a conversation between the user and the chatbot is established in the talk room.

When the posted information is related to a printing instruction (step S402: YES), the CPU 31 determines whether the posting is made by an administrator of the talk room (step S404). Here, the administrator is registered in the table illustrated in FIG. 16. The CPU 31 refers to the table illustrated in FIG. 16 to determine whether the user as a poster is registered as the administrator. For example, as illustrated in FIG. 22, when information M162 and information M163 which are related to a printing instruction are posted in the talk room, the CPU 31 determines whether the user who posts is the administrator.

When the user who posts the information is the administrator (step S404: YES), the CPU 31 proceeds to a process in step S410. When the user who posts the information is not the administrator (step S404: NO), the CPU 31 checks the number of print copies (step S405). For example, as illustrated in FIG. 22, the CPU 31 posts information M164 asking the user the number of print copies, in the talk room. In response to this, the user posts information M165 indicating the number of print copies, so that the CPU 31 checks the number of print copies.

The CPU 31 checks usage authority of the user (step S406). Here, the CPU 31 checks the usage authority of the user in the talk room where the information is posted, with reference to the table illustrated in FIG. 16. In particular, among the usage authorities, the CPU 31 checks whether the user is permitted to print or whether the number of remaining pages which the user is permitted to print is larger than zero.

Then, the CPU 31 determines whether at least one of (i) a condition that the user is not permitted to execute printing or (ii) a condition that the number of remaining pages which the user is permitted to print is zero is satisfied, based on the checked usage authorities (step S407). When none of (i) the condition that the user is not permitted to execute printing and (ii) the condition that the number of remaining pages which the user is permitted to print is zero is satisfied (step S407: NO), the CPU 31 proceeds to the process in step S410.

When at least one of (i) the condition that the user is not permitted to execute printing or (ii) the condition that the number of remaining pages which the user is permitted to print is zero is satisfied (step S407: YES), the CPU 31 performs an error notification (step S408). For example, as illustrated in FIG. 22, the CPU 31 posts information M166 indicating that the number of print pages exceeds the number of pages which the user is permitted to print and thus it is not possible to complete printing, in the talk room.

In response to the error notification, the CPU 31 determines whether the usage authority is expanded (step S409). The expansion of the usage authority is to permit the number of print pages exceeding the usage authority, and for example, the administrator of the talk room may give this permission. For example, as illustrated in FIG. 22, the user B who posts the information related to the printing instruction posts information M167 indicating that he/she wants to continue printing. In response to this post, a user A as the administrator of a talk room X posts information M168 indicating that continuation of printing is permitted. Accordingly, the usage authority is expanded.

When the usage authority is not expanded (step S409: NO), the CPU 31 ends the execution process without executing printing. Here, a time limit by which the expansion of the usage authority is received may be set.

When the usage authority is expanded (step S409: YES), the CPU 31 executes a printing process (step S410). The printing process is a process of causing the image forming apparatus 40 to execute printing based on the information which is related to the printing instruction and which is posted by the user. Here, the CPU 31 causes the image forming apparatus 40 to execute printing based on print settings for the talk room which are set for the user in the talk room, with reference to the table illustrated in FIG. 16. As illustrated in FIG. 22, the CPU 31 posts information M169 indicating that printing is to be executed.

Subsequently, the CPU 31 determines whether there is a limitation in the number of print pages in the printing process executed in step S410 (step S411). The CPU 31 may determine the limitation in the number of print pages depending on whether the usage authorities checked in step S406 include the number of printable pages. For example, the CPU 31 refers to the table in FIG. 17, and when the printing process executed in step S410 is monochrome printing, the CPU 31 determines that the number of print pages is limited to 50. Meanwhile, when the user who posts the information related to the printing instruction is the administrator, there is no limitation in the number of print pages. Therefore, the CPU 31 checks the table in FIG. 16, and when the user is the administrator, the CPU 31 determines that there is no limitation in the number of print pages.

When there is no limitation in the number of print pages (step S411: NO), the CPU 31 ends the execution process.

When there is a limitation in the number of print pages (step S411: YES), the CPU 31 subtracts the number of pages in the printing process executed in step S410, from the number of remaining printable pages (step S412). For example, when the number of remaining pages printable in monochrome is 50 and 20 pages are printed in monochrome in step S410, the number of remaining pages printable in monochrome is 30. In the tables of FIGS. 16 and 17, the CPU 31 rewrites the number of remaining pages printable in monochrome, in the usage authority. Then, the CPU 31 ends the execution process.

Next, descriptions will be made on a setting registration process of registering a change in print settings (a processing method of a specific process) by the chatbot server 30.

Figure 23:
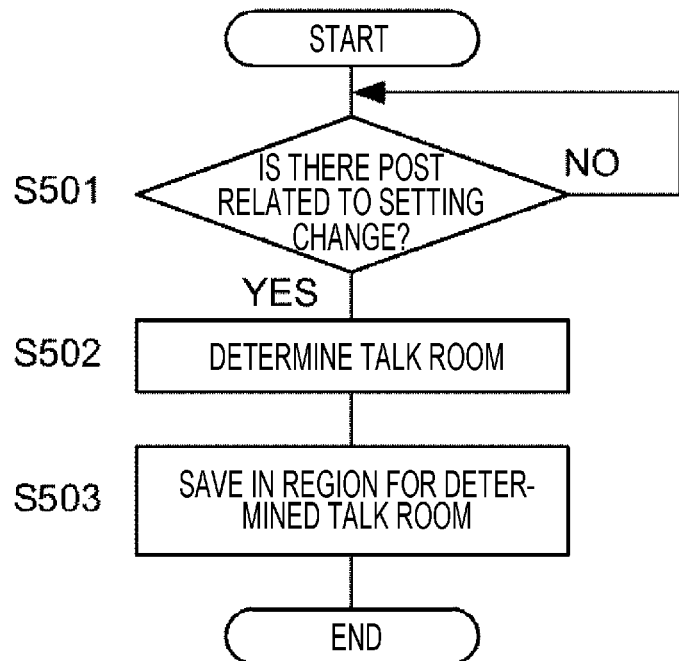
FIG. 23 is a flow chart of a setting registration process.
Figure 24:
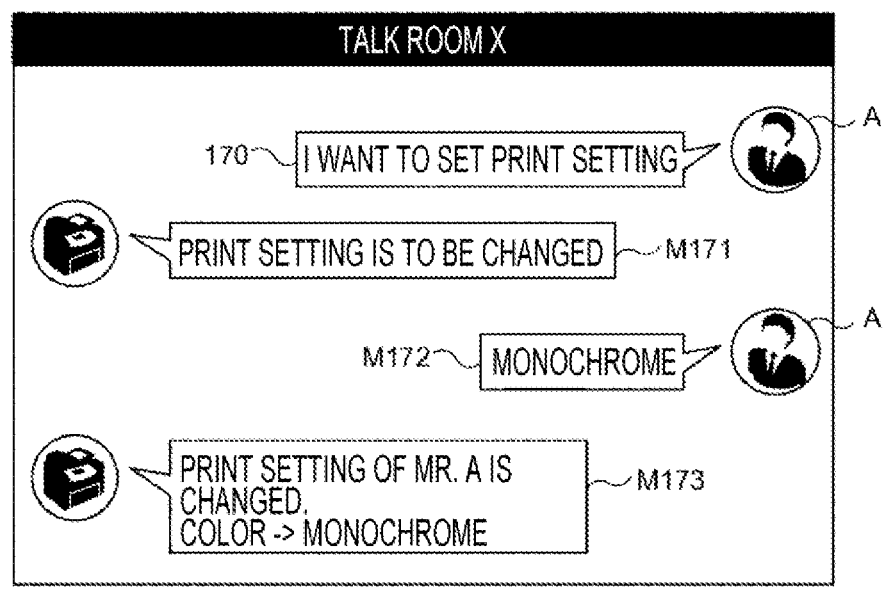
FIG. 24 is a view illustrating a state where posting is made in a talk room.
Figure 25:
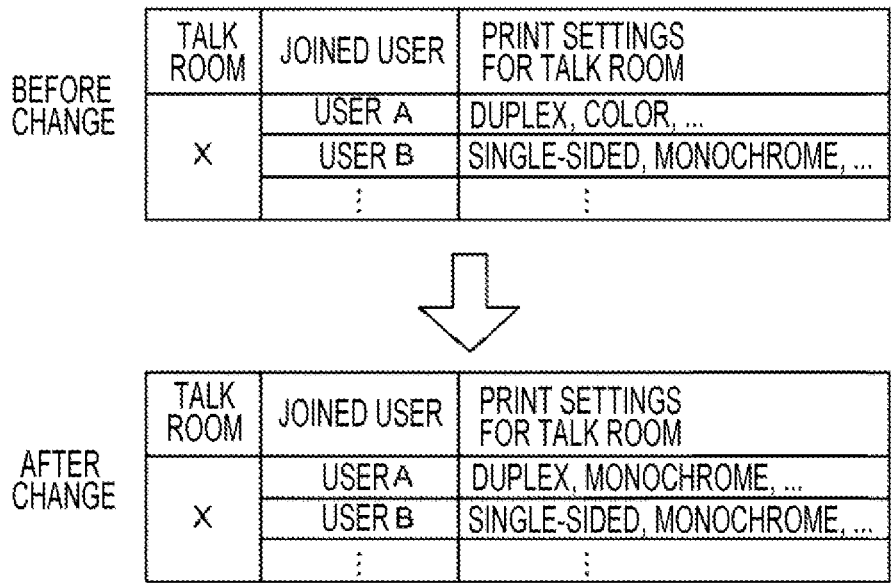
FIG. 25 is a view illustrating a table in which a print setting is changed.
Figure 26:
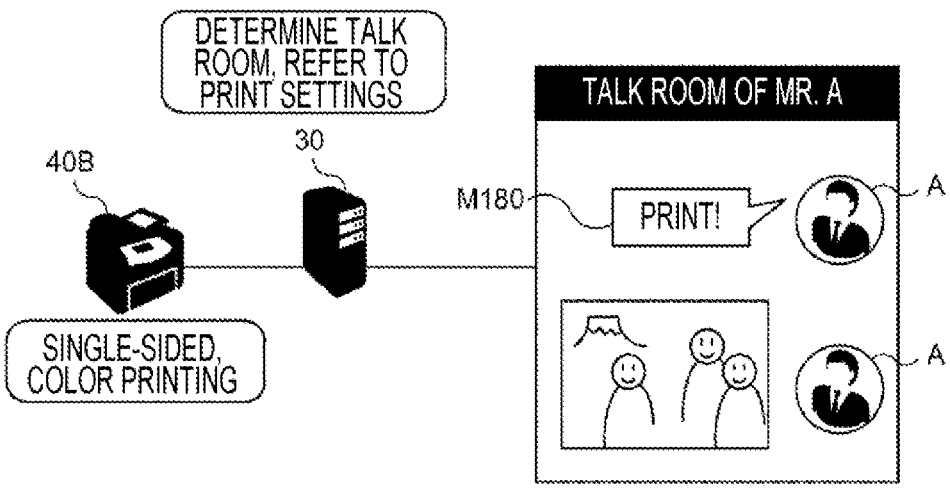
FIG. 26 is a view illustrating a state where printing is executed based on a printing instruction of a user.

FIG. 23 is a flow chart illustrating the setting registration process. The setting registration process is a flow of a process executed by the chatbot server 30 as the registration unit, in the control process by the chatbot server 30. The setting registration process is performed by the CPU 31 reading a control program from the ROM 32 or the storage 34, and loading and executing the control program on the RAM 33. FIG. 24 is a view illustrating a state where posting is made in a talk room. FIG. 25 is a view illustrating a table in which a print setting is changed. FIG. 26 is a view illustrating a state where printing is executed based on a printing instruction of a user.

The CPU 31 determines whether information related to a change in a print setting is posted in a talk room (step S501). Here, for example, as illustrated in FIG. 24, when information M170 related to a change in a print setting is posted, the CPU 31 posts information M171 indicating that the change in the print setting is received, and waits for information indicating specific contents related to the change in the print setting.

When the information is not posted in the talk room (step S501: NO), the CPU 31 waits until the information is posted.

When the information is posted in the talk room (step S501: YES), the CPU 31 determines the talk room where the information is posted (step S502). For example, in the example illustrated in FIG. 24, the CPU 31 determines that information is posted in the talk room X. The information may be posted in a talk room in which plural users participate or may be posted in a dedicated talk room in which a single user and a single chatbot participate.

The CPU 31 changes a print setting for the talk room determined in step S502, according to the information posted by the user (step S503). For example, as illustrated in FIG. 24, when a user A posts information M172 related to the specific contents of the change in the print setting, the CPU 31 posts information M173 indicating that the print setting is changed. Here, the CPU 31 rewrites a region where print settings associated with the talk room X and the user A are registered, in the storage 34. Accordingly, the table is rewritten as illustrated in FIG. 25. FIG. 25 is a view illustrating talk room print settings for the talk room X, which are extracted from the table illustrated in FIG. 16.

As described above, a print setting is changed and registered, for each talk room. Accordingly, print settings based on information posted in a talk room are effective only in the talk room where the information is posted. That is, when the user A in the example of FIG. 24 posts information related to a printing instruction in a talk room different from the talk room X, the print settings registered in association with the talk room X are not used. Descriptions will be given on a case where the user A posts information M180 related to a printing instruction in a dedicated talk room in which only the user A him/herself and a chatbot participate as illustrated in FIG. 26. In this case, the CPU 31 of the chatbot server 30 determines that the talk room where the information is posted is a talk room dedicated to the user A, and then refers to print setting of the user A which is associated with the dedicated talk room. For example, when the referenced print setting is "single-sided, color printing", the change of the print setting of the user A which is associated with the talk room X as illustrated in FIG. 25 is not used, and printing is executed by "single-sided, color printing".

In the example illustrated in FIG. 24, when the user posts the information M170 indicating that he/she wants to change a print setting, the print setting is changed. However, a print setting may be changed according to information related to a printing instruction, regardless of posting of the information indicating that the change of the print setting is desired.

Figure 27:
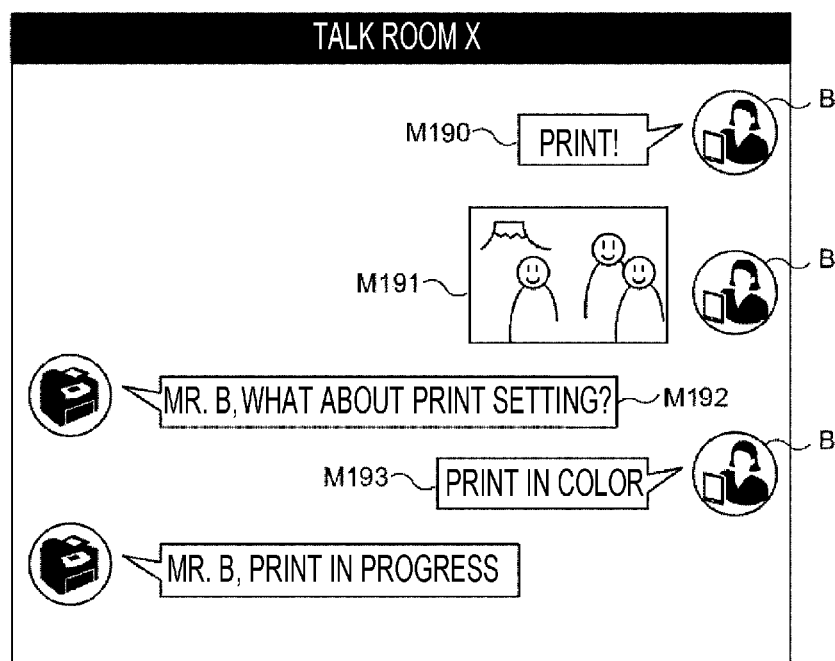
FIG. 27 is a view illustrating a state where posting is made in a talk room.

FIG. 27 is a view illustrating a state where posting is made in a talk room.

As illustrated in FIG. 27, the user B posts information M190 and information M191 which are related to a printing instruction. Here, the CPU 31 may post information M192 asking the user B to confirm a print setting. When the user B posts information M193 related to specific contents of the print setting in response to the information M192, the CPU 31 compares the print setting based on the posting with a print setting which is registered in the storage 34 and which is associated with the talk room X and the user B. When the print setting registered in the storage 34 is different from the print setting based on the posting, the CPU 31 updates the print setting registered in the storage 34, with the print setting based on the posting. In this manner, it is possible to change a print setting associated with a talk room and a user, based on information related to a printing instruction.

In the second exemplary embodiment, the descriptions have been made on the case where when a certain user posts information related to a printing instruction, only the user who posts the information is capable of determining print settings. However, any user other than the user who posts the information may be allowed to supplement or change print settings.

Figure 28:
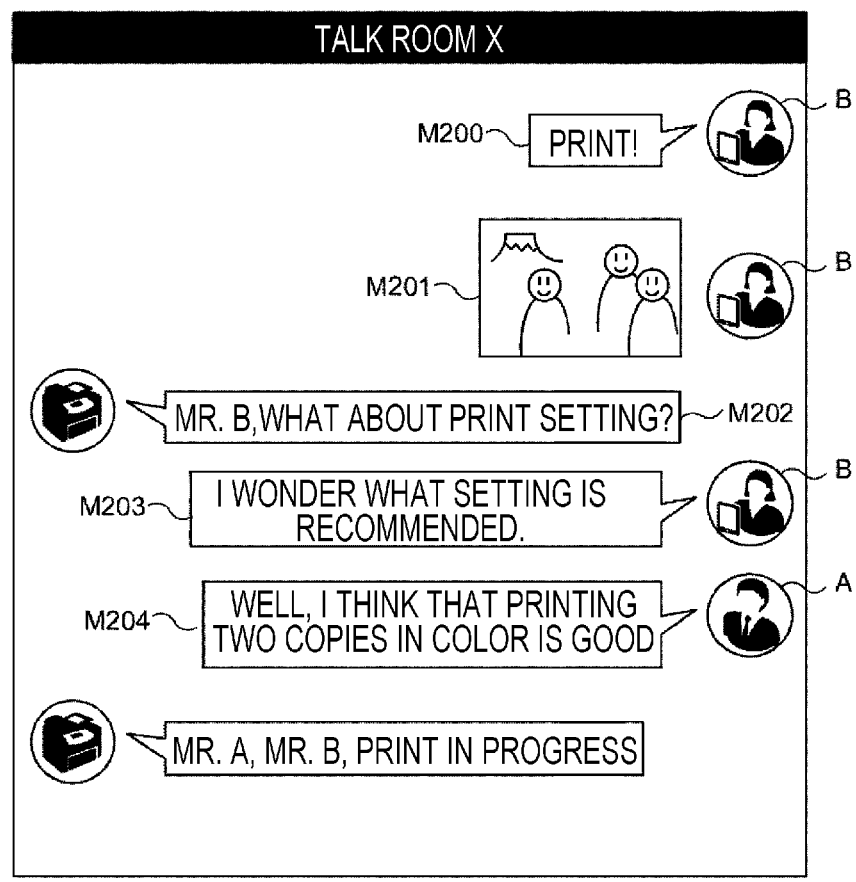
FIG. 28 is a view illustrating a state where posting is made in a talk room.
Figure 29:
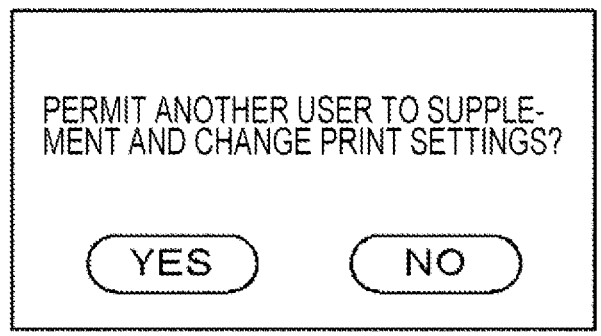
FIG. 29 is a view illustrating an example of a screen to receive as to whether to permit another user to supplement and change.

FIG. 28 is a view illustrating a state where posting is made in a talk room. FIG. 29 is a view illustrating an example of a screen to receive as to whether to permit another user to supplement and change.

As illustrated in FIG. 28, information M200 and information M201 which are related to a printing instruction are posted. The CPU 31 posts information M202 asking for a print setting. Here, when a user B who post the information posts information M203 or the like, requesting an opinion from another user in the talk room X, a user A posts information M204 related to specific contents of the print setting. The CPU 31 executes printing based on the information M200 and M201 which are posted by the user B and the information M204 posted by the user A.

In this manner, even when the user B posts information first, the user A instead of the user B may instruct the CPU 31 to set a print setting for the purpose of printing related to the information. In this case, setting registration associated with the talk room X and the user B may or may not be updated based on the instruction of the user A.

As described above, it is possible to set, in advance, whether to permit the user A, other than the user B who posts information, to set a print setting. For example, when a user joins a talk room, information to ask whether to permit another user to supplement and change a print setting is displayed on the user terminal 10 as illustrated in FIG. 29. Here, when the permission (Yes) is selected, it is possible for the other user A to set a print setting as illustrated in FIG. 28.

In the above exemplary embodiments, the case where the talk room server 20 and the chatbot server 30 are different devices is described. Alternatively, the talk room server 20 and the chatbot server 30 may be implemented by a single device.

The above described processes may also be implemented by a dedicated hardware circuit. In this case, this may be executed by a single hardware or executed by plural hardware modules.

A program that operates the chatbot server 30 may be provided by a computer-readable recording medium such as a universal serial bus (USB) memory, a flexible disc, or a compact disc read only memory (CD-ROM), or may be provided online via a network such as the Internet. In this case, a program recorded in the computer-readable recording medium is usually transmitted to and stored in a memory, a storage, or the like. This program may be provided as, for example, application software alone, or may be incorporated into software of each device, as one function of the chatbot server 30.

The foregoing description of the exemplary embodiments of the present disclosure has been provided for the purposes of illustration and description. It is not intended to be exhaustive or to limit the present disclosure to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control apparatus comprising:
a registration unit configured to:
before information related to an instruction for causing an information processing apparatus to execute a specific process is posted by a user in a talk room where each of plural participating users is capable of posting and viewing information, register, in advance, the information processing apparatus to execute the specific process according to the information, in association with the talk room;
register at least one of the plural participating users as an administrator; and
register usage authority of the information processing apparatus that is set to any user among the plural participating users by the user registered as the administrator,
wherein the usage authority is set when the user registered as the administrator posts information related to the usage authority on the any user, in the talk room.

2. The control apparatus according to claim 1, wherein the talk room or the information processing apparatus is capable of outputting the usage authority that is set to the any user.

3. The control apparatus according to claim 1, further comprising:
an execution controller,
wherein when the specific process executed by the information processing apparatus according to the information posted by the user to which the usage authority is set exceeds the usage authority, information indicating that the usage authority is exceeded is posted in the talk room.

4. The control apparatus according to claim 3, wherein when information indicating that the specific process exceeding the usage authority is permitted is posted by the user registered as the administrator, in relation to the information indicating that the usage authority is exceeded, the execution controller causes the information processing apparatus to execute a process exceeding the usage authority.

5. A non-transitory computer readable medium storing a program that causes a computer to execute a control process, the control process comprising:

before information related to an instruction for causing an information processing apparatus to execute a specific process is posted by a user in a talk room where each of plural participating users is capable of posting and viewing information, registering, in advance, the information processing apparatus to execute the specific process according to the information, in association with the talk room;

registering at least one of the participating plural users as an administrator; and registering usage authority of the information processing apparatus that is set to any user among the plural participating users by the user registered as the administrator, wherein the usage authority is set when the user registered as the administrator posts information related to the usage authority on the any user, in the talk room.

\* \* \* \* \*